United States Patent
Becker et al.

(10) Patent No.: US 10,126,415 B2
(45) Date of Patent: Nov. 13, 2018

(54) PROBE THAT COOPERATES WITH A LASER TRACKER TO MEASURE SIX DEGREES OF FREEDOM

(71) Applicant: FARO Technologies, Inc., Lake Mary, FL (US)

(72) Inventors: Bernd-Dietmar Becker, Ludwigsburg (DE); Rolf Heidemann, Stuttgart (DE); Oliver Zweigle, Stuttgart (DE); Matthias Wolke, Korntal-Münchingen (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 342 days.

(21) Appl. No.: 14/982,259

(22) Filed: Dec. 29, 2015

(65) Prior Publication Data

US 2016/0187470 A1    Jun. 30, 2016

Related U.S. Application Data

(60) Provisional application No. 62/101,113, filed on Jan. 8, 2015, provisional application No. 62/098,394, filed on Dec. 31, 2014.

(51) Int. Cl.
| | |
|---|---|
| *G01S 7/497* | (2006.01) |
| *G01S 17/66* | (2006.01) |
| *G01S 17/87* | (2006.01) |
| *G01S 17/42* | (2006.01) |
| *G01S 7/481* | (2006.01) |
| *G01S 7/486* | (2006.01) |

(52) U.S. Cl.
CPC .............. *G01S 7/497* (2013.01); *G01S 7/481* (2013.01); *G01S 7/4818* (2013.01); *G01S 7/4863* (2013.01); *G01S 17/42* (2013.01); *G01S 17/66* (2013.01); *G01S 17/87* (2013.01)

(58) Field of Classification Search
CPC .... G01B 11/002; G01B 21/045; G01B 11/14; G01C 15/002; G01S 7/4808; G01S 7/4811; G01S 7/4813; G01S 7/4815; G01S 7/4972; G01S 17/42; G01S 17/66; G01S 17/89; G01S 7/481
See application file for complete search history.

(56) References Cited

U.S. PATENT DOCUMENTS

| | | | |
|---|---|---|---|
| 7,800,758 B1 | 9/2010 | Bridges et al. | |
| 2005/0228579 A1* | 10/2005 | Urman | B60J 5/062 |
| | | | 701/124 |
| 2007/0247615 A1 | 10/2007 | Bridges | |

(Continued)

*Primary Examiner* — Luke D Ratcliffe
(74) *Attorney, Agent, or Firm* — Cantor Colburn LLP

(57) ABSTRACT

A system includes a measurement device configured to measure a distance, a first angle, and a second angle to a retroreflector target. The system further includes a probe having the retroreflector target, an inclinometer sensor, a camera, and a processor, the inclinometer sensor configured to determine a two-dimensional inclination of the probe relative to a gravity vector, the camera configured to capture an image of a light emitted from or reflected by the measurement device, the processor configured to determine six degrees of freedom of the probe based at least in part on the distance, the first angle, the second angle, the two-dimensional inclination, and the captured image of the camera.

33 Claims, 31 Drawing Sheets

(56) References Cited

U.S. PATENT DOCUMENTS

| | | |
|---|---|---|
| 2009/0262974 A1* | 10/2009 | Lithopoulos ............ G01C 3/08 |
| | | 382/100 |
| 2010/0128259 A1 | 5/2010 | Bridges et al. |
| 2012/0262550 A1 | 10/2012 | Bridges |
| 2013/0155386 A1 | 6/2013 | Bridges |
| 2013/0222791 A1* | 8/2013 | Steffey ................ G01B 11/002 |
| | | 356/72 |
| 2014/0028805 A1 | 1/2014 | Tohme |
| 2015/0365653 A1 | 12/2015 | Yazid |
| 2015/0373321 A1 | 12/2015 | Bridges |
| 2016/0138915 A1* | 5/2016 | Green ..................... G01C 3/08 |
| | | 356/4.01 |

* cited by examiner

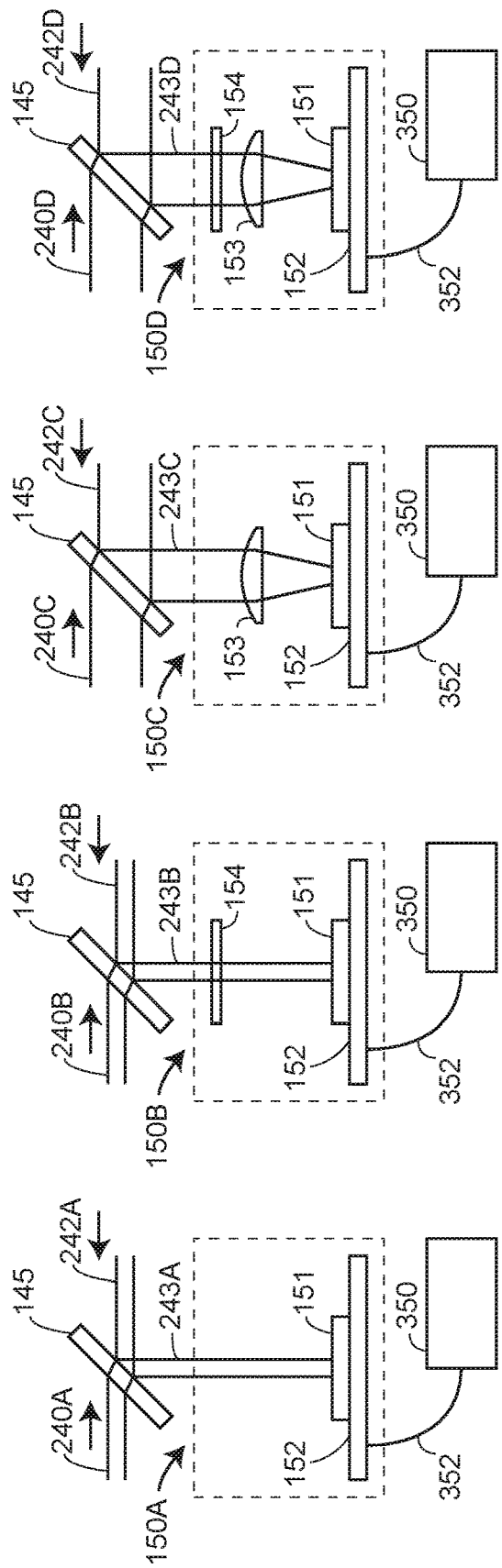

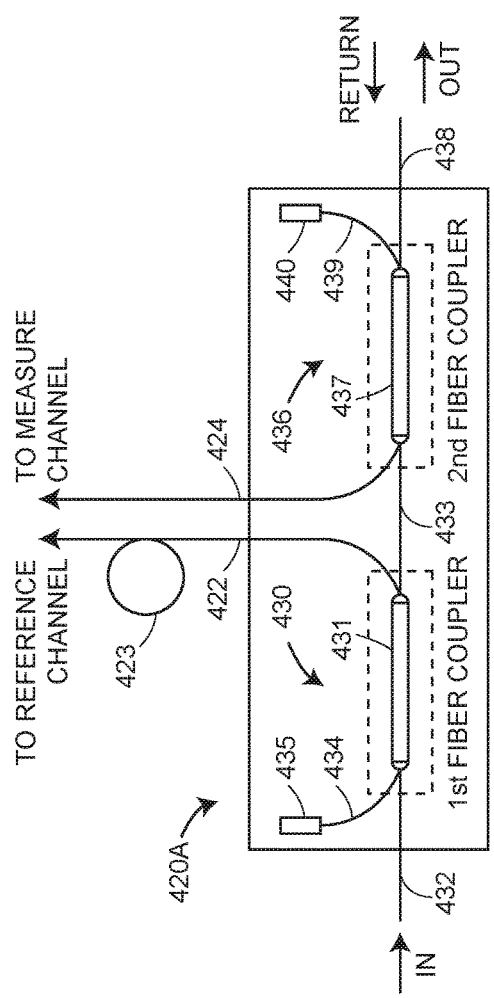
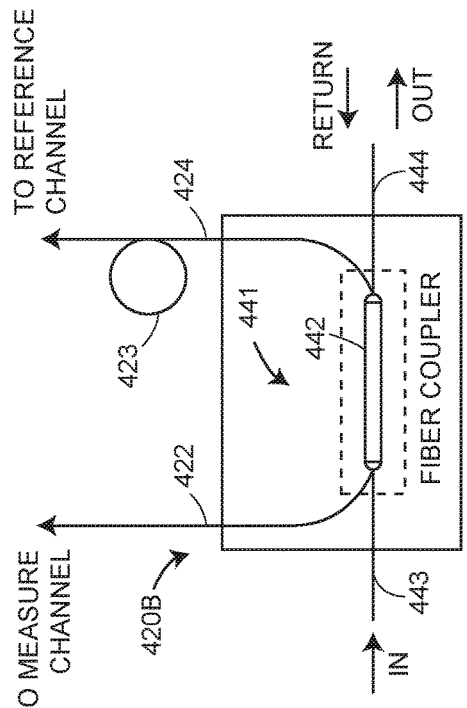
PRIOR ART
FIGURE 8A
PRIOR ART
FIGURE 8B

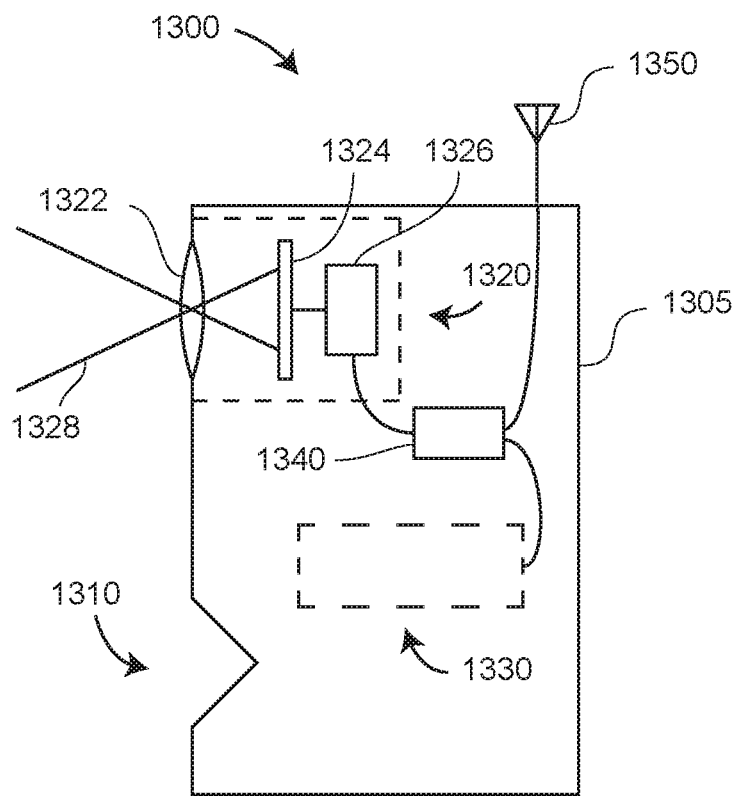
FIG. 14
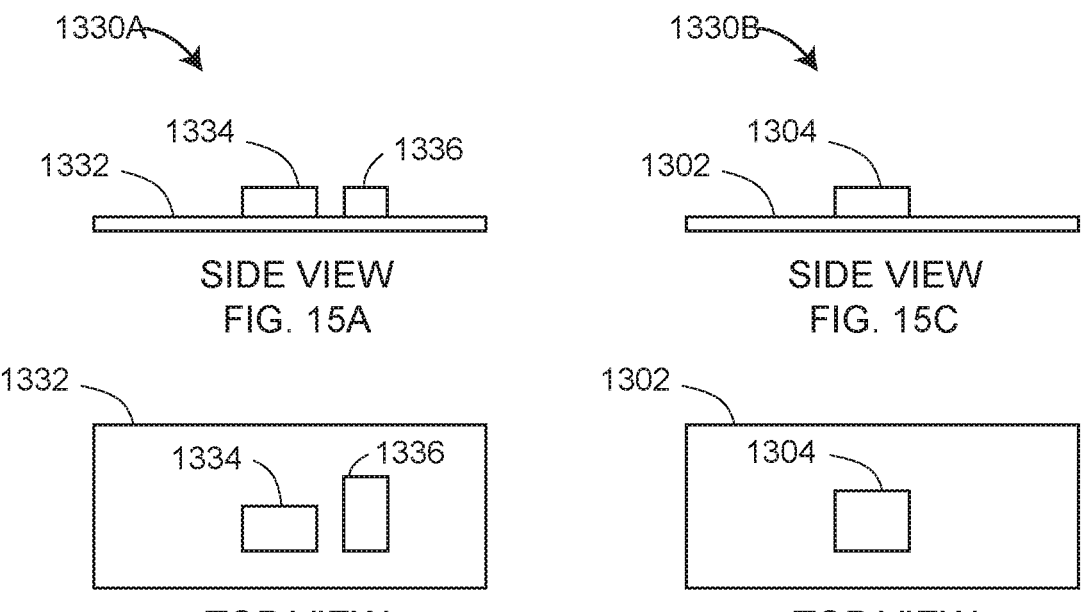
SIDE VIEW
FIG. 15A
SIDE VIEW
FIG. 15C
TOP VIEW
FIG. 15B
TOP VIEW
FIG. 15D

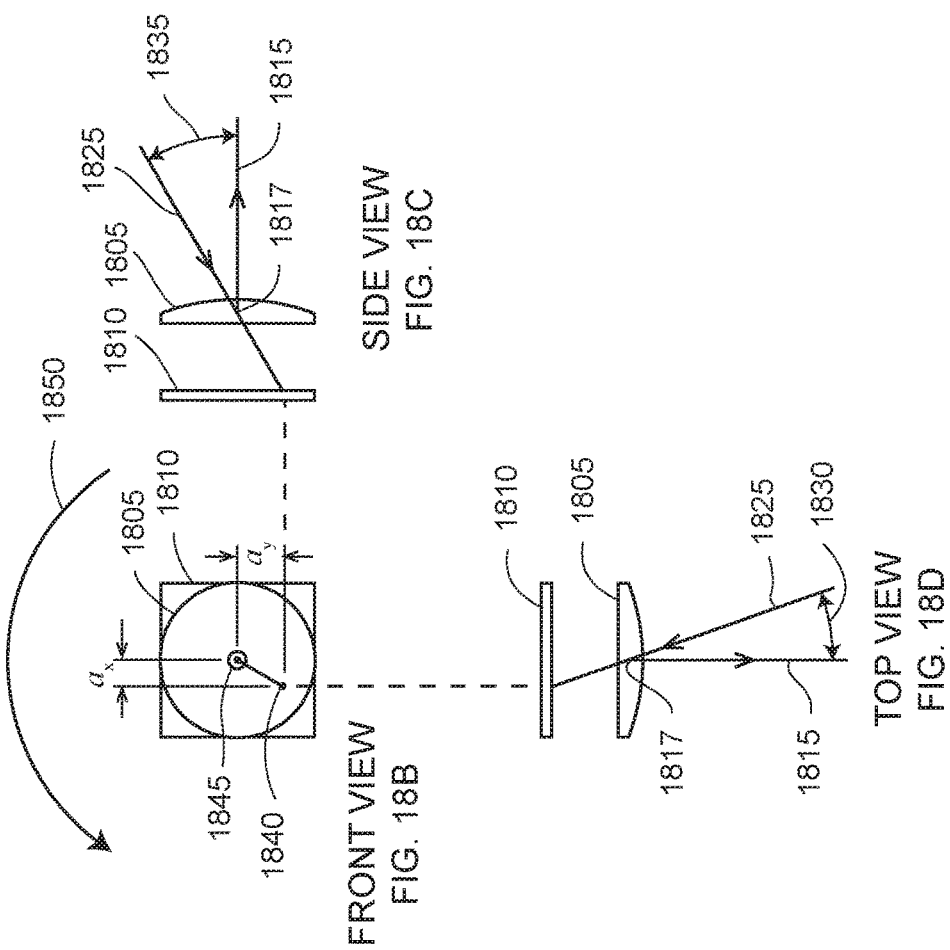

PROBE THAT COOPERATES WITH A LASER TRACKER TO MEASURE SIX DEGREES OF FREEDOM

CROSS-REFERENCE TO RELATED APPLICATIONS

The present application claims the benefit of U.S. Provisional Patent Application No. 62/098,394, which was filed on Dec. 31, 2014, and also claims the benefit of U.S. Provisional Patent Application No. 62/101,113, which was filed on Jan. 8, 2015, the contents both of which are incorporated by reference herein.

BACKGROUND

The present disclosure relates to a coordinate measuring device. One set of coordinate measurement devices belongs to a class of instruments that measure the three-dimensional (3D) coordinates of a point by sending a beam of light to the point. The beam of light may impinge directly on the point or on a retroreflector target in contact with the point. In either case, the instrument determines the coordinates of the point by measuring the distance and the two angles to the target. The distance is measured with a distance-measuring device such as an absolute distance meter or an interferometer. The angles are measured with an angle-measuring device such as an angular encoder. A gimbaled beam-steering mechanism within the instrument directs the laser beam to the point of interest. The laser tracker is a particular type of coordinate-measuring device that tracks a retroreflector target with one or more beams of light it emits.

Ordinarily the laser tracker sends a laser beam to a retroreflector target. A common type of retroreflector target is the spherically mounted retroreflector (SMR), which comprises a cube-corner retroreflector embedded within a metal sphere. The cube-corner retroreflector comprises three mutually perpendicular mirrors. The vertex, which is the common point of intersection of the three mirrors, is located at the center of the sphere. Because of this placement of the cube corner within the sphere, the perpendicular distance from the vertex to any surface on which the SMR rests remains constant, even as the SMR is rotated. Consequently, the laser tracker can measure the 3D coordinates of a surface by following the position of an SMR as it is moved over the surface. Stating this another way, the laser tracker needs to measure only three degrees of freedom (one radial distance and two angles) to fully characterize the 3D coordinates of a surface.

One type of laser tracker contains only an interferometer (IFM) without an absolute distance meter (ADM). If an object blocks the path of the laser beam from one of these trackers, the IFM loses its distance reference. The operator must then track the retroreflector to a known location to reset to a reference distance before continuing the measurement. A way around this limitation is to put an ADM in the tracker.

A gimbal mechanism within the laser tracker may be used to direct a laser beam from the tracker to the SMR. Part of the light retroreflected by the SMR enters the laser tracker and passes onto a position detector. A control system within the laser tracker can use the position of the light on the position detector to adjust the rotation angles of the mechanical axes of the laser tracker to keep the laser beam centered on the SMR. In this way, the tracker is able to follow (track) an SMR that is moved over the surface of an object of interest.

Angle measuring devices such as angular encoders are attached to the mechanical axes of the tracker. The one distance measurement and two angle measurements performed by the laser tracker are sufficient to completely specify the three-dimensional location of the SMR.

Several laser trackers are available or have been proposed for measuring six, rather than the ordinary three, degrees of freedom (DOF). However, six-DOF probes available today do not ordinarily work with a wide range of laser trackers—for example, with older model trackers or with trackers from a variety of manufacturers.

While existing six-DOF probes are suitable for their intended purpose, there remains a need for six-DOF probes that work with a wide variety of laser trackers.

SUMMARY

According to an embodiment of the present invention, a system comprises: a measurement device configured to send a first beam of light to a retroreflector target and to measure a distance, a first angle, and a second angle to the retroreflector target; and a probe assembly including the retroreflector target, an inclinometer sensor, and a camera, the inclinometer sensor configured to determine a two-dimensional inclination of the probe assembly relative to a gravity vector, the retroreflector configured to reflect the first beam of light as a first reflected light, the camera configured to capture an image of a second light, the system being configured to determine six degrees of freedom of the probe assembly based at least in part on the measured distance, the measured first angle, the measured second angle, the measured two-dimensional inclination, and the captured image of the camera.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIGS. 4A and 4B, shows two types of prior art afocal beam expanders;

FIGS. 6A-D are schematic figures that show four types of prior art position detector assemblies;

FIGS. 8A and 8B are schematic figures showing fiber-optic elements within a prior art fiber-optic network;

FIG. 14 is a schematic representation of elements in a six-DOF probe according to an embodiment of the present invention;

FIGS. 15A, 15B, 15C, and 15D are schematic representations of one- and two-axis inclinometers mounted on circuit boards according to an embodiment of the present invention;

FIGS. 18B, 18C, and 18D illustrate how an image from a probe camera assists in determining six degrees-of-freedom according to an embodiment;

DETAILED DESCRIPTION

Figure 1:
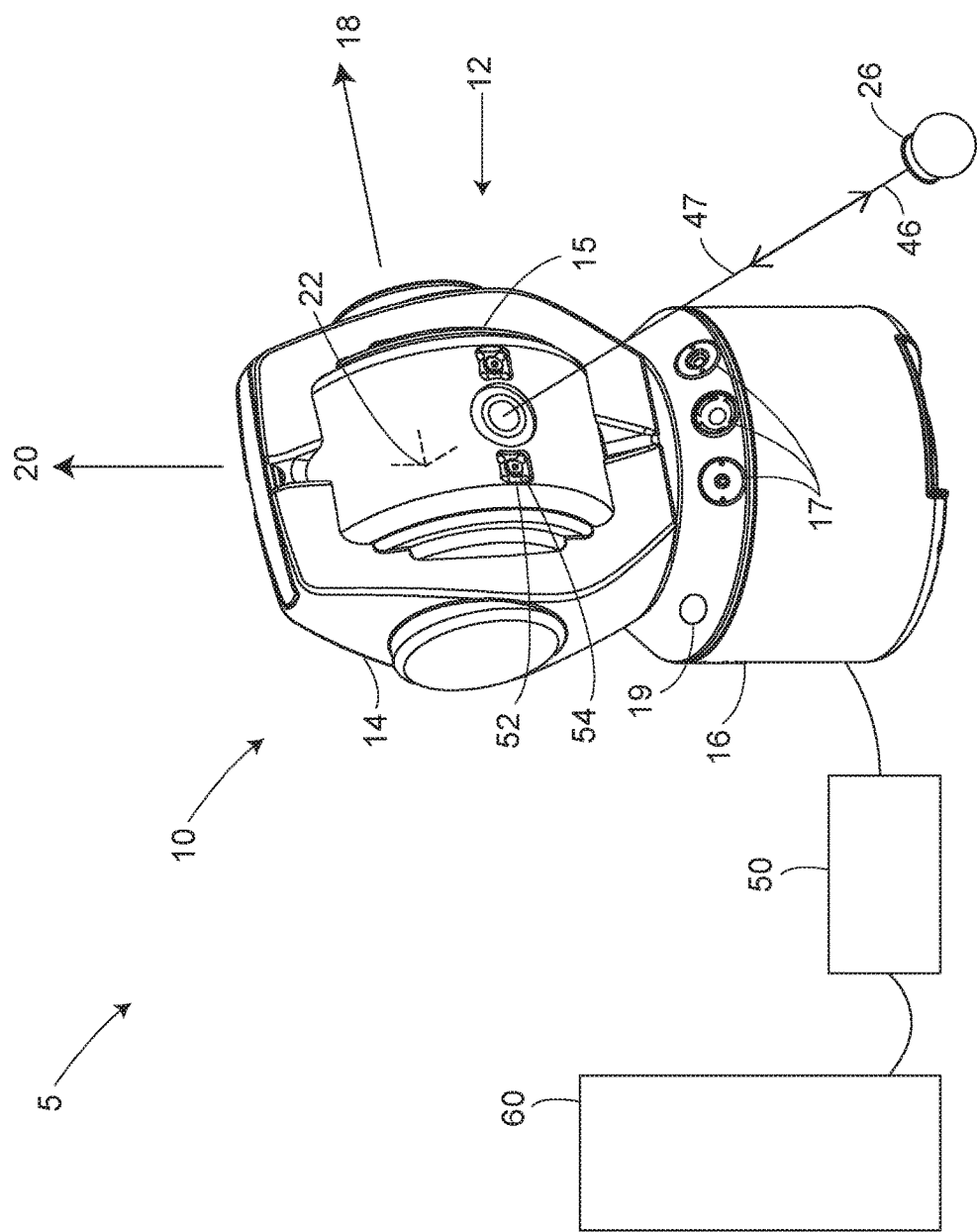
FIG. 1 is a perspective view of a laser tracker system with a retroreflector target in accordance with an embodiment of the present invention.

An exemplary laser tracker system 5 illustrated in FIG. 1 includes a laser tracker 10, a retroreflector target 26, an optional auxiliary unit processor 50, and an optional auxiliary computer 60. An exemplary gimbaled beam-steering mechanism 12 of laser tracker 10 comprises a zenith carriage 14 mounted on an azimuth base 16 and rotated about an azimuth axis 20. A payload 15 is mounted on the zenith carriage 14 and rotated about a zenith axis 18. Zenith axis 18 and azimuth axis 20 intersect orthogonally, internally to tracker 10, at gimbal point 22, which is typically the origin for distance measurements. A laser beam 46 virtually passes through the gimbal point 22 and is pointed orthogonal to zenith axis 18. In other words, laser beam 46 lies in a plane approximately perpendicular to the zenith axis 18 and that passes through the azimuth axis 20. Outgoing laser beam 46 is pointed in the desired direction by rotation of payload 15 about zenith axis 18 and by rotation of zenith carriage 14 about azimuth axis 20. A zenith angular encoder, internal to the tracker, is attached to a zenith mechanical axis aligned to the zenith axis 18. An azimuth angular encoder, internal to the tracker, is attached to an azimuth mechanical axis aligned to the azimuth axis 20. The zenith and azimuth angular encoders measure the zenith and azimuth angles of rotation to relatively high accuracy. Outgoing laser beam 46 travels to the retroreflector target 26, which might be, for example, a spherically mounted retroreflector (SMR) as described above. By measuring the radial distance between gimbal point 22 and retroreflector 26, the rotation angle about the zenith axis 18, and the rotation angle about the azimuth axis 20, the position of retroreflector 26 is found within the spherical coordinate system of the tracker.

Outgoing laser beam 46 may include one or more laser wavelengths, as described hereinafter. For the sake of clarity and simplicity, a steering mechanism of the sort shown in FIG. 1 is assumed in the following discussion. However, other types of steering mechanisms are possible. For example, it is possible to reflect a laser beam off a mirror rotated about the azimuth and zenith axes. The techniques described herein are applicable, regardless of the type of steering mechanism.

Magnetic nests 17 may be included on the laser tracker for resetting the laser tracker to a "home" position for different sized SMRs—for example, 1.5, ⅞, and ½ inch SMRs. An on-tracker retroreflector 19 may be used to reset the tracker to a reference distance. In addition, an on-tracker mirror, not visible from the view of FIG. 1, may be used in combination with the on-tracker retroreflector to enable performance of a self-compensation.

Figure 2:
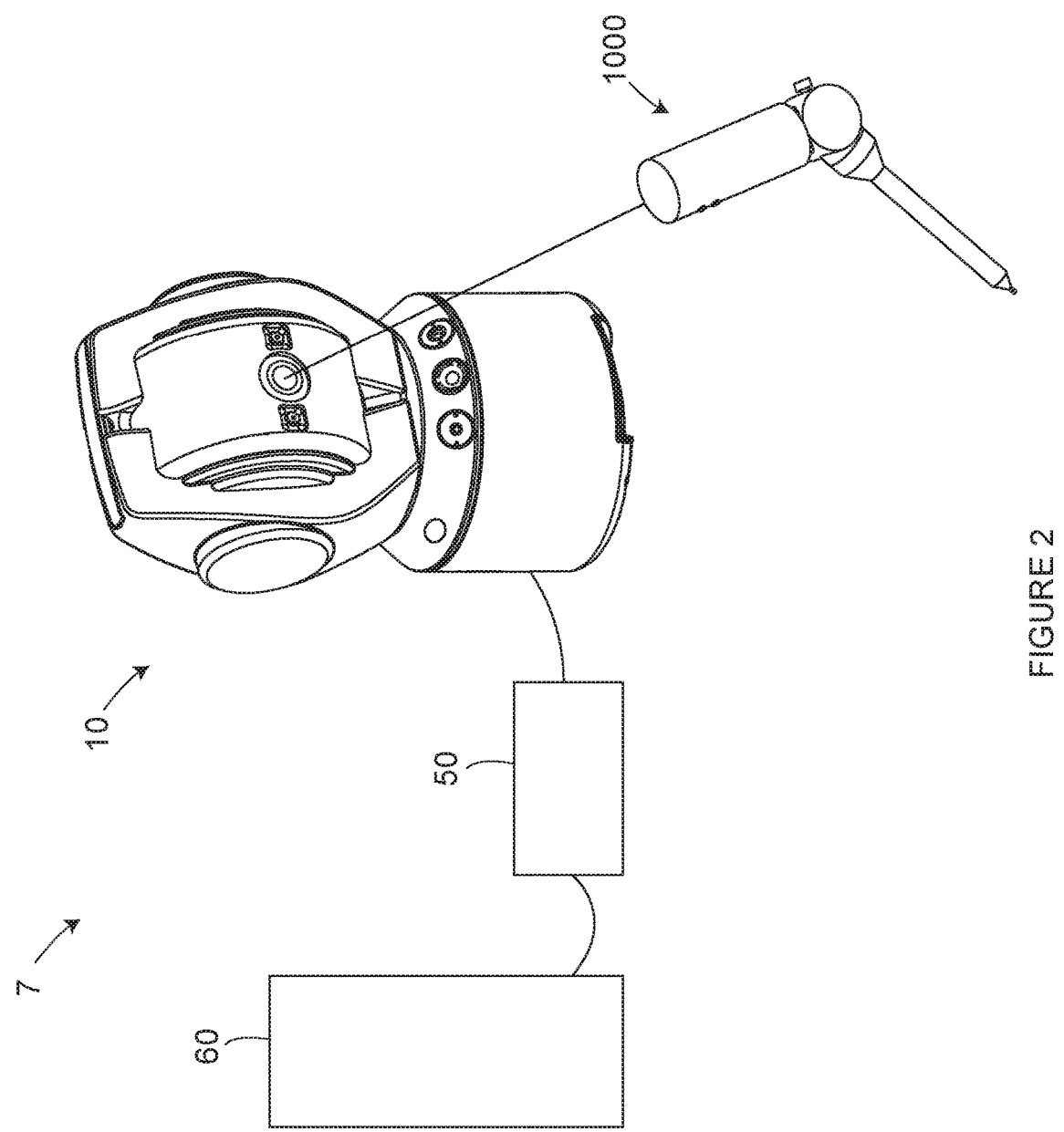
FIG. 2 is a perspective view of a laser tracker system with a six-DOF target in accordance with an embodiment of the present invention.

FIG. 2 shows an exemplary laser tracker system 7 that is like the laser tracker system 5 of FIG. 1 except that retroreflector target 26 is replaced with a six-DOF probe 1000. In FIG. 1, other types of retroreflector targets may be used. For example, a cateye retroreflector, which is a glass retroreflector in which light focuses to a small spot of light on a reflective rear surface of the glass structure, is sometimes used.

Figure 3:
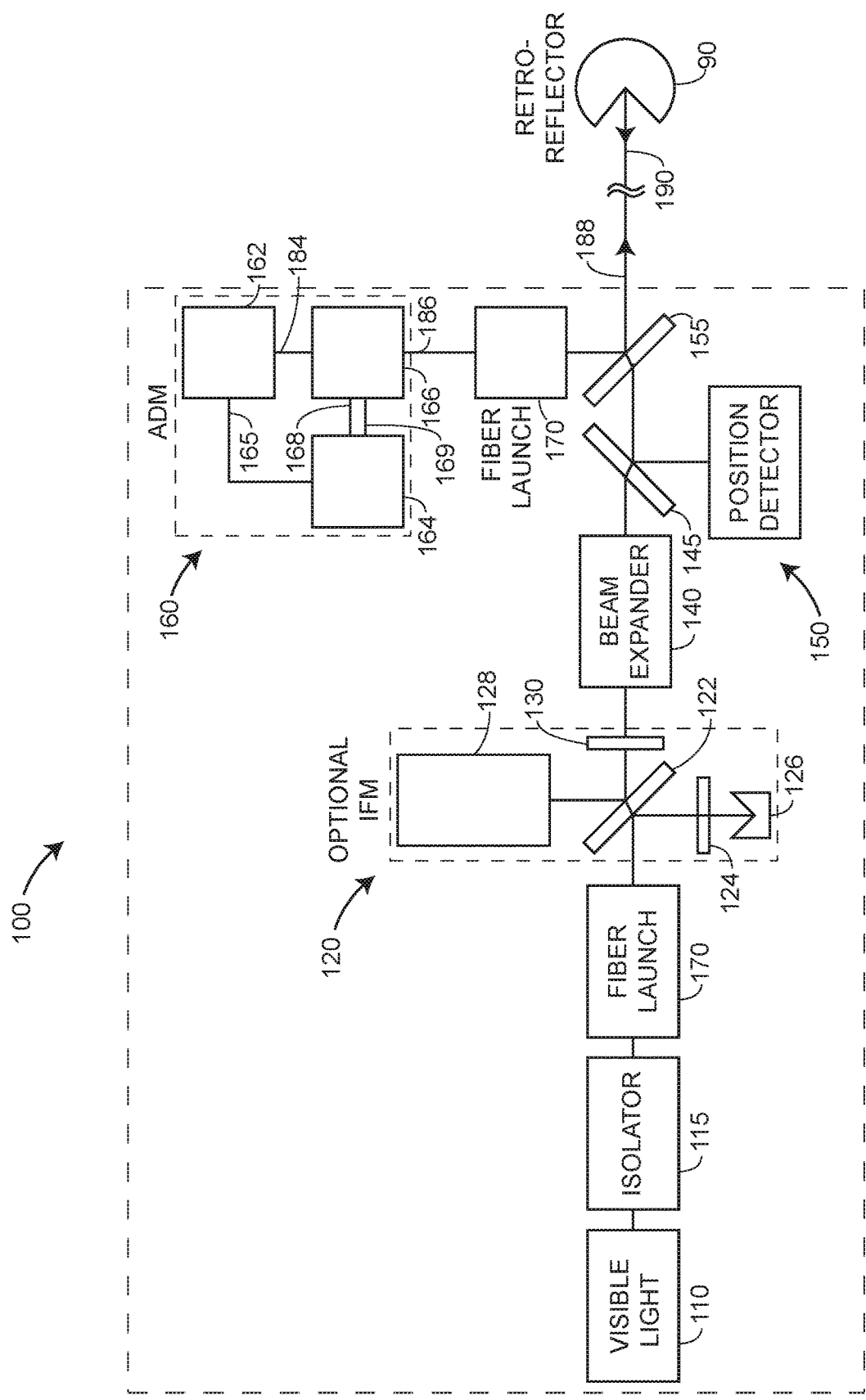
FIG. 3 is a block diagram describing elements of laser tracker optics and electronics in accordance with an embodiment of the present invention.

FIG. 3 is a block diagram showing optical and electrical elements in a laser tracker embodiment. It shows elements of a laser tracker that emit two wavelengths of light—a first wavelength for an ADM and a second wavelength for a visible pointer and for tracking. The visible pointer enables the user to see the position of the laser beam spot emitted by the tracker. The two different wavelengths are combined using a free-space beam splitter. Electrooptic (EO) system 100 includes visible light source 110, isolator 115, optional first fiber launch 170, optional interferometer (IFM) 120, beam expander 140, first beam splitter 145, position detector assembly 150, second beam splitter 155, ADM 160, and second fiber launch 170.

Visible light source 110 may be a laser, superluminescent diode, or other light emitting device. The isolator 115 may be a Faraday isolator, attenuator, or other device capable of reducing the light that reflects back into the light source. Optional IFM 120 may be configured in a variety of ways. As a specific example of a possible implementation, the IFM may include a beam splitter 122, a retroreflector 126, quarter waveplates 124, 130, and a phase analyzer 128. The visible light source 110 may launch the light into free space, the light then traveling in free space through the isolator 115, and optional IFM 120. Alternatively, the isolator 115 may be coupled to the visible light source 110 by a fiber optic cable. In this case, the light from the isolator may be launched into free space through the first fiber-optic launch 170, as discussed herein below with reference to FIG. 5.

Figure 4:
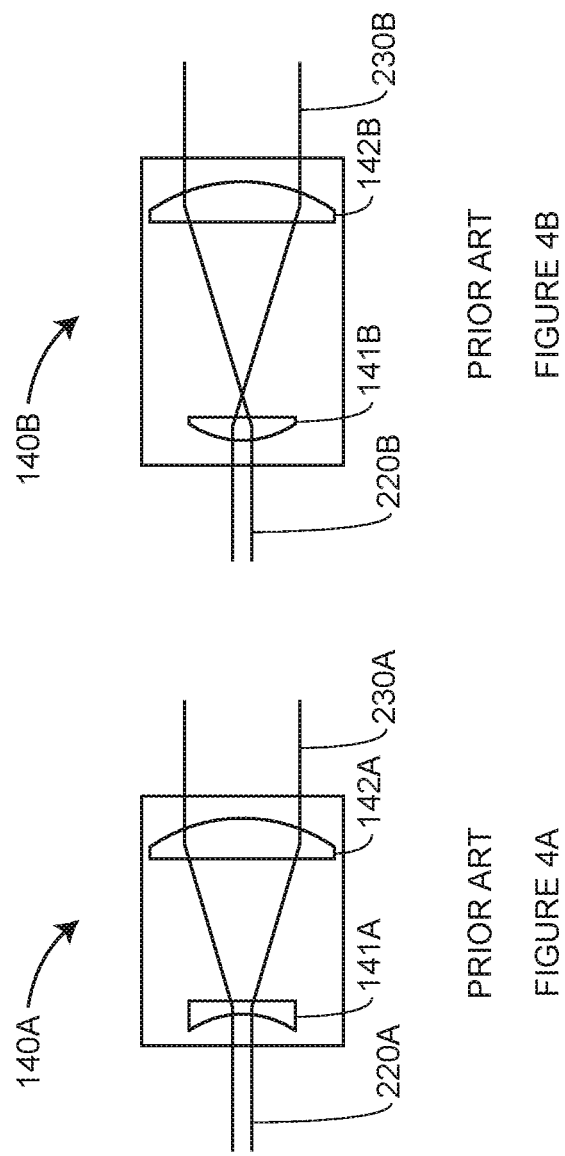
FIG. 4, which includes

Beam expander 140 may be set up using a variety of lens configurations, but two commonly used prior-art configurations are shown in FIGS. 4A, 4B. FIG. 4A shows a configuration 140A based on the use of a negative lens 141A and a positive lens 142A. A beam of collimated light 220A incident on the negative lens 141A emerges from the positive lens 142A as a larger beam of collimated light 230A. FIG. 4B shows a configuration 140B based on the use of two positive lenses 141B, 142B. A beam of collimated light 220B incident on a first positive lens 141B emerges from a second positive lens 142B as a larger beam of collimated light 230B. Of the light leaving the beam expander 140, a small amount reflects off the beam splitters 145, 155 on the way out of the tracker and is lost. That part of the light that passes through the beam splitter 155 is combined with light from the ADM 160 to form a composite beam of light 188 that leaves that laser tracker and travels to the retroreflector 90.

In an embodiment, the ADM 160 includes a light source 162, ADM electronics 164, a fiber network 166, an interconnecting electrical cable 165, and interconnecting optical fibers 168, 169, 184, 186. ADM electronics send electrical modulation and bias voltages to light source 162, which may, for example, be a distributed feedback laser that operates at a wavelength of approximately 1550 nm. In an embodiment, the fiber network 166 may be the prior art fiber-optic network 420A shown in FIG. 8A. In this embodiment, light from the light source 162 in FIG. 3 travels over the optical fiber 184, which is equivalent to the optical fiber 432 in FIG. 8A.

The fiber network of FIG. 8A includes a first fiber coupler 430, a second fiber coupler 436, and low-transmission reflectors 435, 440. The light travels through the first fiber coupler 430 and splits between two paths, the first path through optical fiber 433 to the second fiber coupler 436 and the second path through optical fiber 422 and fiber length equalizer 423. Fiber length equalizer 423 connects to fiber length 168 in FIG. 3, which travels to the reference channel of the ADM electronics 164. The purpose of fiber length equalizer 423 is to match the length of optical fibers traversed by light in the reference channel to the length of optical fibers traversed by light in the measure channel. Matching the fiber lengths in this way reduces ADM errors caused by changes in the ambient temperature. Such errors may arise because the effective optical path length of an optical fiber is equal to the average index of refraction of the optical fiber times the length of the fiber. Since the index of refraction of the optical fibers depends on the temperature of the fiber, a change in the temperature of the optical fibers causes changes in the effective optical path lengths of the measure and reference channels. If the effective optical path length of the optical fiber in the measure channel changes relative to the effective optical path length of the optical fiber in the reference channel, the result will be an apparent shift in the position of the retroreflector target 90, even if the retroreflector target 90 is kept stationary. To get around this problem, two steps are taken. First, the length of the fiber in the reference channel is matched, as nearly as possible, to the length of the fiber in the measure channel. Second, the measure and reference fibers are routed side by side to the extent possible to ensure that the optical fibers in the two channels see nearly the same changes in temperature.

The light travels through the second fiber optic coupler 436 and splits into two paths, the first path to the low-reflection fiber terminator 440 and the second path to optical fiber 438, from which it travels to optical fiber 186 in FIG. 3. The light on optical fiber 186 travels through to the second fiber launch 170.

Figure 5:
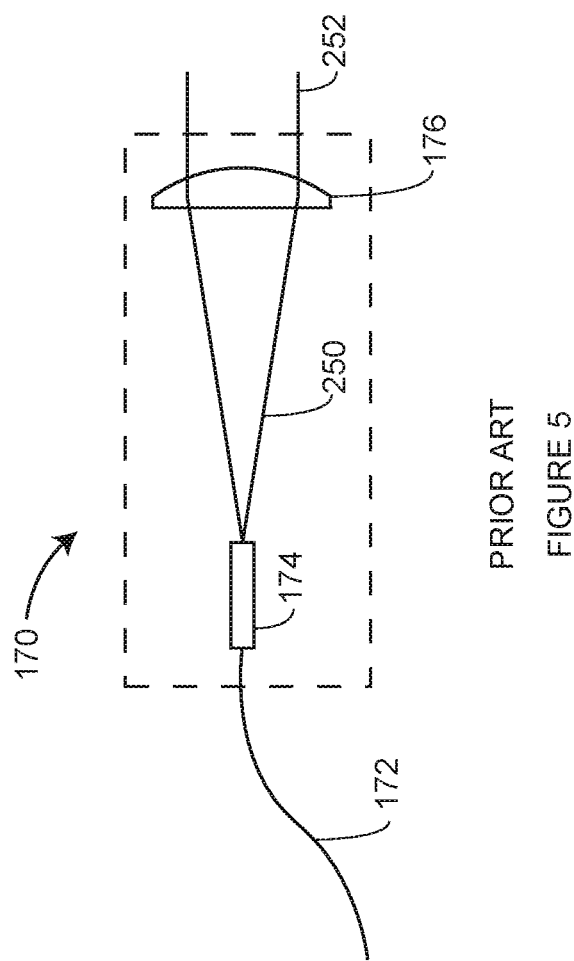
FIG. 5 shows a prior art fiber-optic beam launch.

In an embodiment, fiber launch 170 is shown in prior art FIG. 5. The light from optical fiber 186 of FIG. 3 goes to fiber 172 in FIG. 5. The fiber launch 170 includes optical fiber 172, ferrule 174, and lens 176. The optical fiber 172 is attached to ferrule 174, which is stably attached to a structure within the laser tracker 10. If desired, the end of the optical fiber may be polished at an angle to reduce back reflections. The light 250 emerges from the core of the fiber, which may be a single mode optical fiber with a diameter of between 4 and 12 micrometers, depending on the wavelength of the light being used and the particular type of optical fiber. The light 250 diverges at an angle and intercepts lens 176, which collimates it. The method of launching and receiving an optical signal through a single optical fiber in an ADM system was described in reference to FIG. 3 in patent '758.

Referring to FIG. 3, the beam splitter 155 may be a dichroic beam splitter, which transmits different wavelengths than it reflects. In an embodiment, the light from the ADM 160 reflects off dichroic beam splitter 155 and combines with the light from the visible laser 110, which is transmitted through the dichroic beam splitter 155. The composite beam of light 188 travels out of the laser tracker to retroreflector 90 as a first beam, which returns a portion of the light as a second beam. That portion of the second beam that is at the ADM wavelength reflects off the dichroic beam splitter 155 and returns to the second fiber launch 170, which couples the light back into the optical fiber 186.

In an embodiment, the optical fiber 186 corresponds to the optical fiber 438 in FIG. 8A. The returning light travels from optical fiber 438 through the second fiber coupler 436 and splits between two paths. A first path leads to optical fiber 424 that, in an embodiment, corresponds to optical fiber 169 that leads to the measure channel of the ADM electronics 164 in FIG. 3. A second path leads to optical fiber 433 and then to the first fiber coupler 430. The light leaving the first fiber coupler 430 splits between two paths, a first path to the optical fiber 432 and a second path to the low reflectance termination 435. In an embodiment, optical fiber 432 corresponds to the optical fiber 184, which leads to the light source 162 in FIG. 3. In most cases, the light source 162 contains a built-in Faraday isolator that minimizes the amount of light that enters the light source from optical fiber 432. Excessive light fed into a laser in the reverse direction can destabilize the laser.

Figure 7:
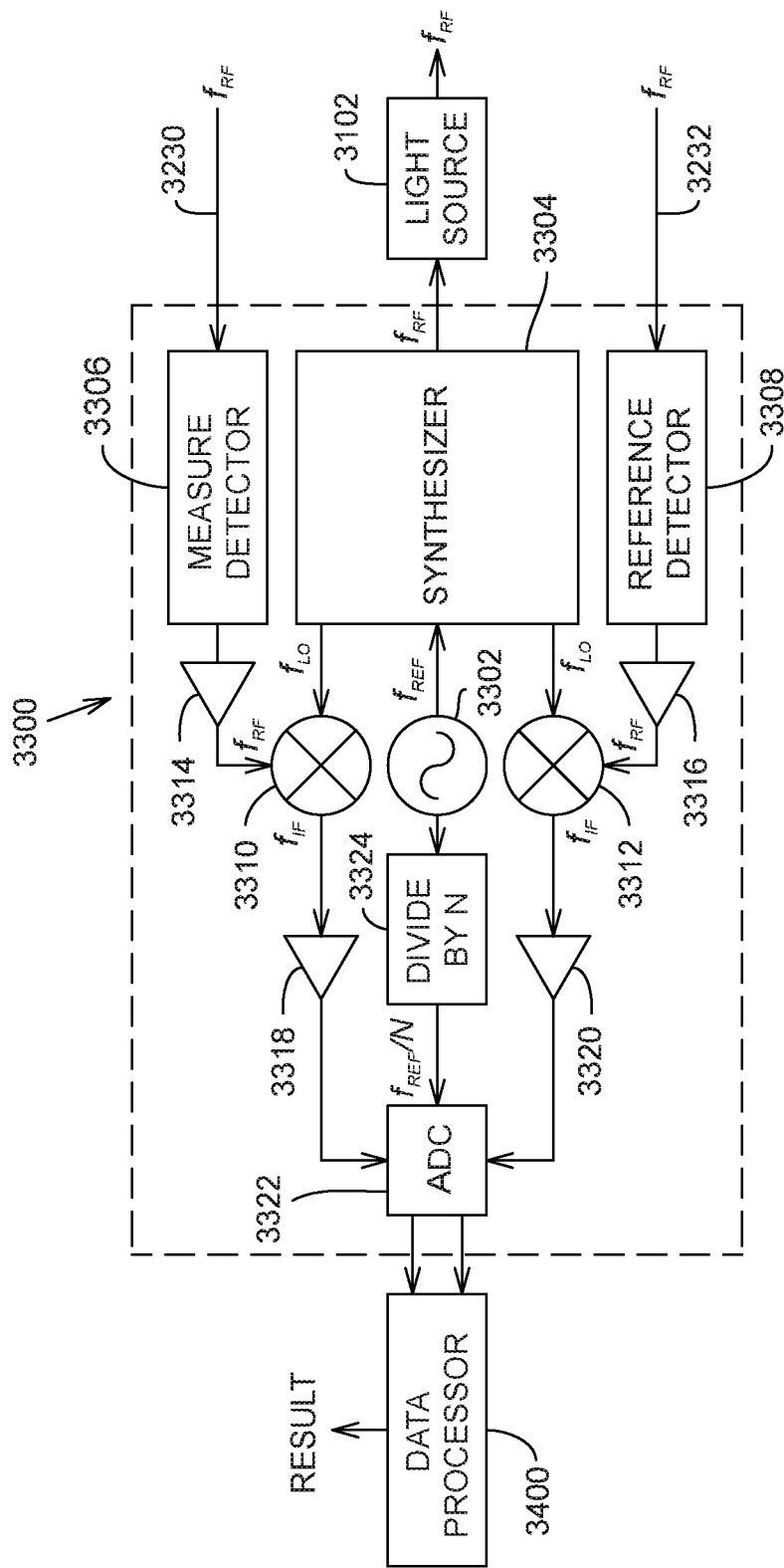
FIG. 7 is a block diagram of electrical and electro-optical elements within a prior art ADM.

The light from the fiber network 166 enters ADM electronics 164 through optical fibers 168, 169. An embodiment of prior art ADM electronics is shown in FIG. 7. Optical fiber 168 in FIG. 3 corresponds to optical fiber 3232 in FIG. 7, and optical fiber 169 in FIG. 3 corresponds to optical fiber 3230 in FIG. 7. Referring now to FIG. 7, ADM electronics 3300 includes a frequency reference 3302, a synthesizer 3304, a measure detector 3306, a reference detector 3308, a measure mixer 3310, a reference mixer 3312, conditioning electronics 3314, 3316, 3318, 3320, a divide-by-N prescaler 3324, and an analog-to-digital converter (ADC) 3322. The frequency reference, which might be an oven-controlled crystal oscillator (OCXO), for example, sends a reference frequency $f_{REF}$, which might be 10 MHz, for example, to the synthesizer, which generates two electrical signals—one signal at a frequency $f_{RF}$ and two signals at frequency $f_{LO}$. The signal $f_{RF}$ goes to the light source 3102, which corresponds to the light source 162 in FIG. 3. The two signals at frequency $f_{LO}$ go to the measure mixer 3310 and the reference mixer 3312. The light from optical fibers 168, 169 in FIG. 3 appear on fibers 3232, 3230 in FIG. 7, respectively, and enter the reference and measure channels, respectively. Reference detector 3308 and measure detector 3306 convert the optical signals into electrical signals. These signals are conditioned by electrical components 3316, 3314, respectively, and are sent to mixers 3312, 3310, respectively. The mixers produce a frequency $f_{IF}$ equal to the absolute value of $f_{LO}$–$f_{RF}$. The signal $f_{RF}$ may be a relatively high frequency, for example, 2 GHz, while the signal $f_{IF}$ may have a relatively low frequency, for example, 10 kHz.

The reference frequency $f_{REF}$ is sent to the prescaler 3324, which divides the frequency by an integer value. For example, a frequency of 10 MHz might be divided by 40 to obtain an output frequency of 250 kHz. In this example, the 10 kHz signals entering the ADC 3322 would be sampled at a rate of 250 kHz, thereby producing 25 samples per cycle. The signals from the ADC 3322 are sent to a data processor 3400, which might, for example, be one or more digital signal processor (DSP) units located in ADM electronics 164 of FIG. 3.

The method for extracting a distance is based on the calculation of phase of the ADC signals for the reference and measure channels. This method is described in detail in U.S. Pat. No. 7,701,559 ('559) to Bridges et al., the contents of which are herein incorporated by reference. Calculation includes use of equations (1)-(8) of patent '559. In addition, when the ADM first begins to measure a retroreflector, the frequencies generated by the synthesizer are changed some number of times (for example, three times), and the possible ADM distances calculated in each case. By comparing the possible ADM distances for each of the selected frequencies, an ambiguity in the ADM measurement is removed. The equations (1)-(8) of patent '559 combined with synchronization methods described with respect to FIG. 5 of patent '559 and the Kalman filter methods described in patent '559 enable the ADM to measure a moving target. In other embodiments, other methods of obtaining absolute distance measurements, for example, by using pulsed time-of-flight rather than phase differences, may be used.

The part of the return light beam 190 that passes through the beam splitter 155 arrives at the beam splitter 145, which sends part of the light to the beam expander 140 and another part of the light to the position detector assembly 150. The light emerging from the laser tracker 10 or EO system 100 may be thought of as a first beam and the portion of that light reflecting off the retroreflector 90 or 26 as a second beam. Portions of the reflected beam are sent to different functional elements of the EO system 100. For example, a first portion may be sent to a distance meter such as an ADM 160 in FIG. 3. A second portion may be sent to a position detector assembly 150. In some cases, a third portion may be sent to other functional units such as an optional interferometer 120. It is important to understand that, although, in the example of FIG. 3, the first portion and the second portion of the second beam are sent to the distance meter and the position detector after reflecting off beam splitters 155 and 145, respectively, it would have been possible to transmit, rather than reflect, the light onto a distance meter or position detector.

Figure 6F:
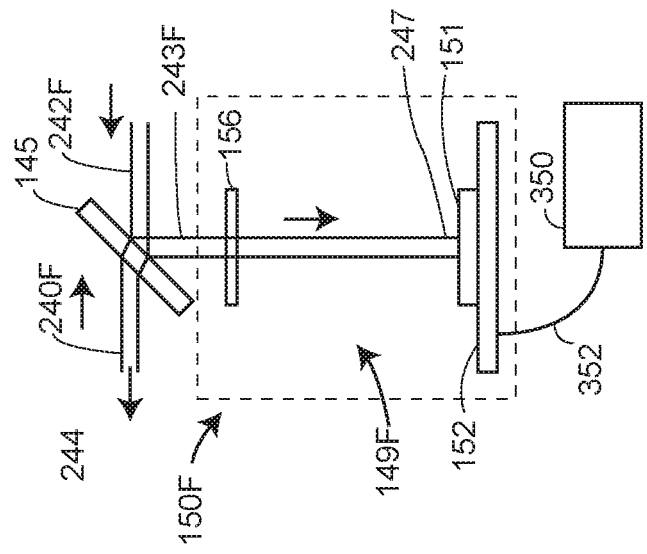
FIGS. 6E and 6F are schematic figures showing position detector assemblies according to embodiments of the present invention.

Four examples of prior art position detector assemblies 150A-150D are shown in FIGS. 6A-D. FIG. 6A depicts the simplest implementation, with the position detector assembly including a position sensor 151 mounted on a circuit board 152 that obtains power from and returns signals to electronics box 350, which may represent electronic processing capability at any location within the laser tracker 10, auxiliary unit 50, or external computer 60. FIG. 6B includes an optical filter 154 that blocks unwanted optical wavelengths from reaching the position sensor 151. The unwanted optical wavelengths may also be blocked, for example, by coating the beam splitter 145 or the surface of the position sensor 151 with an appropriate film. FIG. 6C includes a lens 153 that reduces the size of the beam of light. FIG. 6D includes both an optical filter 154 and a lens 153.

Figure 6E:
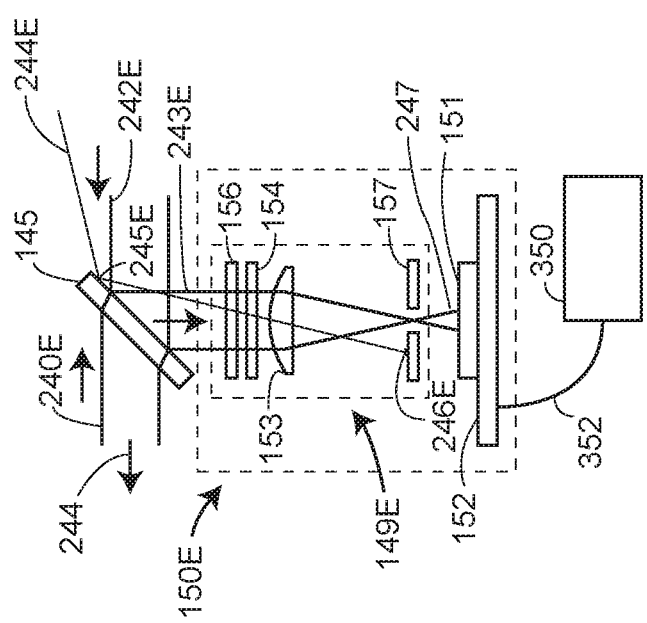

FIG. 6E shows a position detector assembly according to an embodiment of the present invention that includes an optical conditioner 149E. Optical conditioner contains a lens 153 and may also contain optional wavelength filter 154. In addition, it includes at least one of a diffuser 156 and a spatial filter 157. As explained hereinabove, a popular type of retroreflector is the cube-corner retroreflector. One type of cube corner retroreflector is made of three mirrors, each joined at right angles to the other two mirrors. Lines of intersection at which these three mirrors are joined may have a finite thickness in which light is not perfectly reflected back to the tracker. The lines of finite thickness are diffracted as they propagate so that upon reaching the position detector they may not appear exactly the same as at the position detector. However, the diffracted light pattern will generally depart from perfect symmetry. As a result, the light that strikes the position detector 151 may have, for example, dips or rises in optical power (hot spots) in the vicinity of the diffracted lines. Because the uniformity of the light from the retroreflector may vary from retroreflector to retroreflector and also because the distribution of light on the position detector may vary as the retroreflector is rotated or tilted, it may be advantageous to include a diffuser 156 to improve the smoothness of the light that strikes the position detector 151. It might be argued that, because an ideal position detector should respond to a centroid and an ideal diffuser should spread a spot symmetrically, there should be no effect on the resulting position given by the position detector. However, in practice the diffuser is observed to improve performance of the position detector assembly, probably because the effects of nonlinearities (imperfections) in the position detector 151 and the lens 153. Cube corner retroreflectors made of glass may also produce non-uniform spots of light at the position detector 151. Variations in a spot of light at a position detector may be particularly prominent from light reflected from cube corners in six-DOF targets. In an embodiment, the diffuser 156 is a holographic diffuser. A holographic diffuser provides controlled, homogeneous light over a specified diffusing angle. In other embodiments, other types of diffusers such as ground glass or "opal" diffusers are used.

The purpose of the spatial filter 157 of the position detector assembly 150E is to block ghost beams that may be the result, for example, of unwanted reflections off optical surfaces, from striking the position detector 151. A spatial filter includes a plate 157 that has an aperture. By placing the spatial filter 157 a distance away from the lens equal approximately to the focal length of the lens, the returning light 243E passes through the spatial filter when it is near its narrowest—at the waist of the beam. Beams that are traveling at a different angle, for example, as a result of reflection of an optical element strike the spatial filter away from the aperture and are blocked from reaching the position detector 151. An example is shown in FIG. 6E, where an unwanted ghost beam 244E reflects off a surface of the beam splitter 145 and travels to spatial filter 157, where it is blocked. Without the spatial filter, the ghost beam 244E would have intercepted the position detector 151, thereby causing the position of the beam 243E on the position detector 151 to be incorrectly determined. Even a weak ghost beam may significantly change the position of the centroid on the position detector 151 if the ghost beam is located a relatively large distance from the main spot of light.

A retroreflector of the sort discussed here, a cube corner or a cateye retroreflector, for example, has the property of reflecting a ray of light that enters the retroreflector in a direction parallel to the incident ray. In addition, the incident and reflected rays are symmetrically placed about the point of symmetry of the retroreflector. For example, in an open-air cube corner retroreflector, the point of symmetry of the retroreflector is the vertex of the cube corner. In a glass cube corner retroreflector, the point of symmetry is also the vertex, but one must consider the bending of the light at the glass-air interface in this case. In a cateye retroreflector having an index of refraction of 2.0, the point of symmetry is the center of the sphere. In a cateye retroreflector made of two glass hemispheres symmetrically seated on a common plane, the point of symmetry is a point lying on the plane and at the spherical center of each hemisphere. The main point is that, for the type of retroreflectors ordinarily used with laser trackers, the light returned by a retroreflector to the tracker is shifted to the other side of the vertex relative to the incident laser beam.

This behavior of a retroreflector 90 in FIG. 3 is the basis for the tracking of the retroreflector by the laser tracker. The position sensor has on its surface an ideal retrace point. The ideal retrace point is the point at which a laser beam sent to the point of symmetry of a retroreflector (e.g., the vertex of the cube corner retroreflector in an SMR) will return. Usually the retrace point is near the center of the position sensor. If the laser beam is sent to one side of the retroreflector, it reflects back on the other side and appears off the retrace point on the position sensor. By noting the position of the returning beam of light on the position sensor, the control system of the laser tracker 10 can cause the motors to move the light beam toward the point of symmetry of the retroreflector.

If the retroreflector is moved transverse to the tracker at a constant velocity, the light beam at the retroreflector will strike the retroreflector (after transients have settled) a fixed offset distance from the point of symmetry of the retroreflector. The laser tracker makes a correction to account for this offset distance at the retroreflector based on scale factor obtained from controlled measurements and based on the distance from the light beam on the position sensor to the ideal retrace point.

As explained hereinabove, the position detector performs two important functions—enabling tracking and correcting measurements to account for the movement of the retroreflector. The position sensor within the position detector may be any type of device capable of measuring a position. For example, the position sensor might be a position sensitive detector or a photosensitive array. The position sensitive detector might be a lateral effect detector or a quadrant detector, for example. The photosensitive array might be a CMOS or CCD array, for example.

In an embodiment, the return light that does not reflect off beam splitter 145 passes through beam expander 140, thereby becoming smaller. In another embodiment, the positions of the position detector and the distance meter are reversed so that the light reflected by the beam splitter 145 travels to the distance meter and the light transmitted by the beam splitter travels to the position detector.

The light continues through optional IFM, through the isolator and into the visible light source 110. At this stage, the optical power should be small enough so that it does not destabilize the visible light source 110.

In an embodiment, the light from visible light source 110 is launched through a beam launch 170 of FIG. 5. The fiber launch may be attached to the output of light source 110 or a fiber optic output of the isolator 115.

In an embodiment, the fiber network 166 of FIG. 3 is prior art fiber network 420B of FIG. 8B. Here the optical fibers 184, 186, 168, 169 of FIG. 3 correspond to optical fibers 443, 444, 424, 422 of FIG. 8B. The fiber network of FIG. 8B is like the fiber network of FIG. 8A except that the fiber network of FIG. 8B has a single fiber coupler instead of two fiber couplers. The advantage of FIG. 8B over FIG. 8A is simplicity; however, FIG. 8B is more likely to have unwanted optical back reflections entering the optical fibers 422 and 424.

Figure 8C:
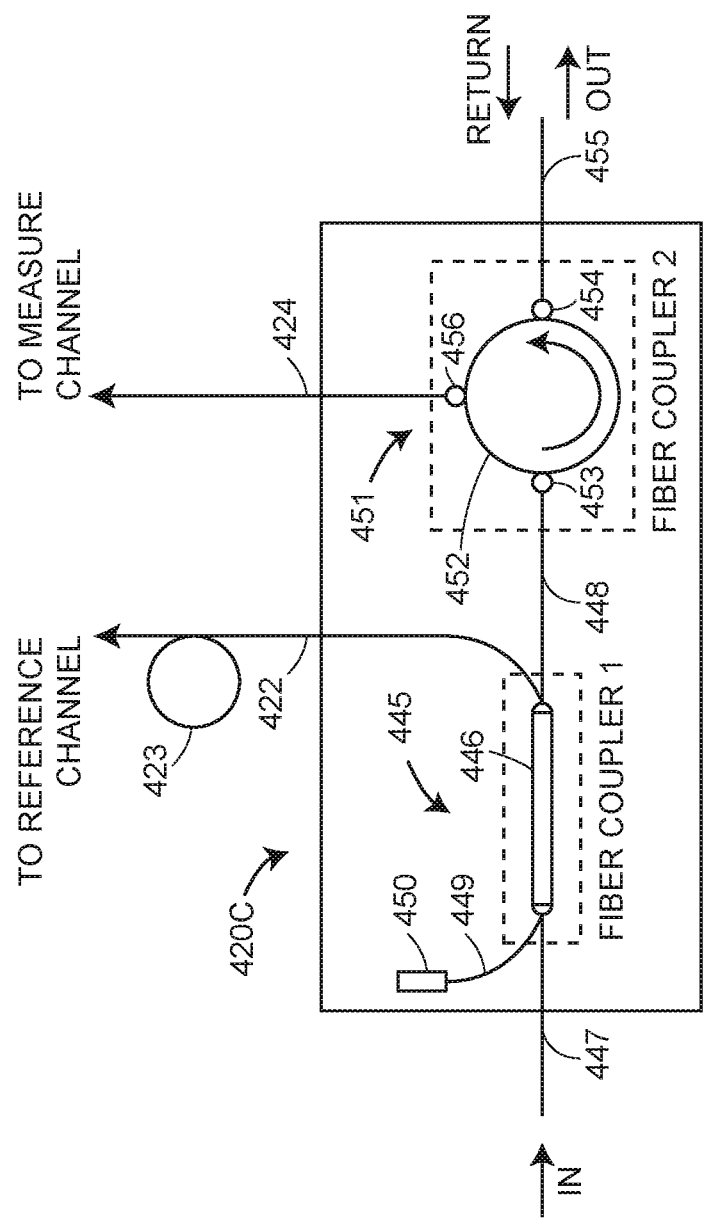
FIG. 8C is a schematic figure showing fiber-optic elements within a fiber-optic network in accordance with an embodiment of the present invention.

In an embodiment, the fiber network 166 of FIG. 3 is fiber network 420C of FIG. 8C. Here the optical fibers 184, 186, 168, 169 of FIG. 3 correspond to optical fibers 447, 455, 423, 424 of FIG. 8C. The fiber network 420C includes a first fiber coupler 445 and a second fiber coupler 451. The first fiber coupler 445 is a 2×2 coupler having two input ports and two output ports. Couplers of this type are usually made by placing two fiber cores in close proximity and then drawing the fibers while heated. In this way, evanescent coupling between the fibers can split off a desired fraction of the light to the adjacent fiber. The second fiber coupler 451 is of the type called a circulator. It has three ports, each having the capability of transmitting or receiving light, but only in the designated direction. For example, the light on optical fiber 448 enters port 453 and is transported toward port 454 as indicated by the arrow. At port 454, light may be transmitted to optical fiber 455. Similarly, light traveling on port 455 may enter port 454 and travel in the direction of the arrow to port 456, where some light may be transmitted to the optical fiber 424. If only three ports are needed, then the circulator 451 may suffer less losses of optical power than the 2×2 coupler. On the other hand, a circulator 451 may be more expensive than a 2×2 coupler, and it may experience polarization mode dispersion, which can be problematic in some situations.

Figure 9:
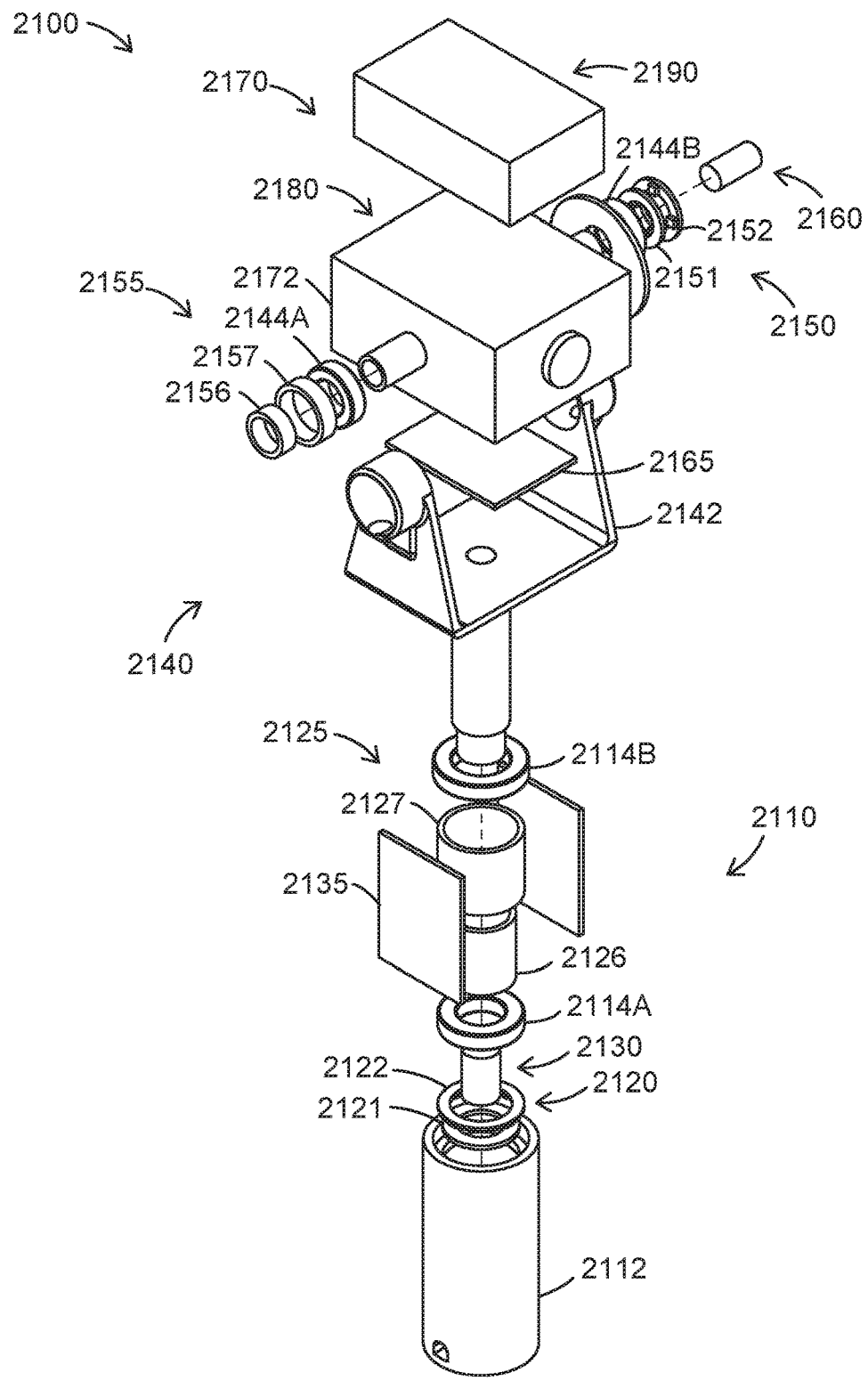
FIG. 9 is an exploded view of a prior art laser tracker.
Figure 10:
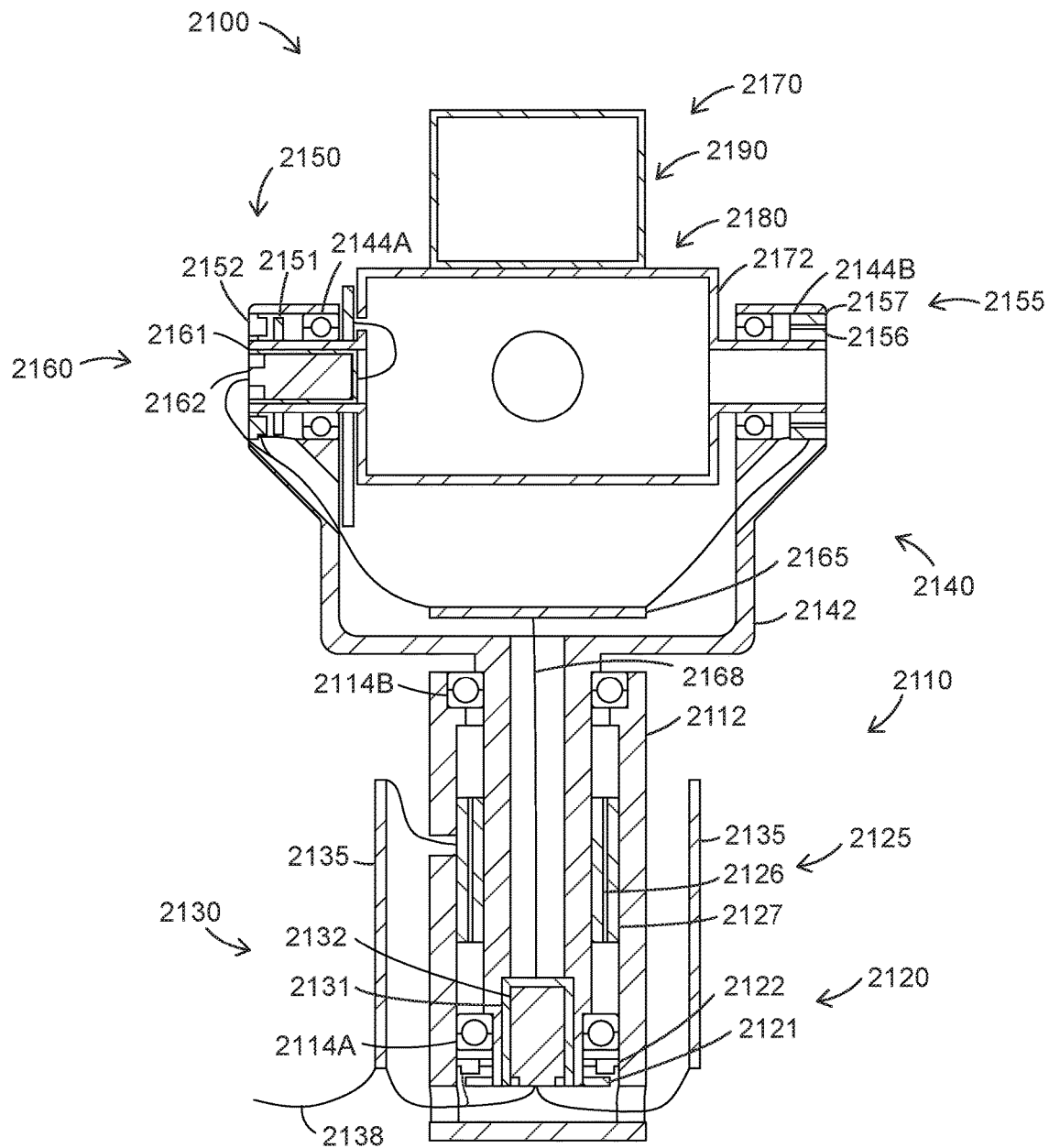
FIG. 10 is a cross-sectional view of a prior art laser tracker.

FIGS. 9 and 10 show exploded and cross sectional views, respectively, of a prior art laser tracker 2100, which is depicted in FIGS. 2 and 3 of U.S. Published Patent Application No. 2010/0128259 to Bridges et al., incorporated by reference. Azimuth assembly 2110 includes post housing 2112, azimuth encoder assembly 2120, lower and upper azimuth bearings 2114A, 2114B, azimuth motor assembly 2125, azimuth slip ring assembly 2130, and azimuth circuit boards 2135.

The purpose of azimuth encoder assembly 2120 is to accurately measure the angle of rotation of yoke 2142 with respect to the post housing 2112. Azimuth encoder assembly 2120 includes encoder disk 2121 and read-head assembly 2122. Encoder disk 2121 is attached to the shaft of yoke housing 2142, and read head assembly 2122 is attached to post assembly 2110. Read head assembly 2122 comprises a circuit board onto which one or more read heads are fastened. Laser light sent from read heads reflect off fine grating lines on encoder disk 2121. Reflected light picked up by detectors on encoder read head(s) is processed to find the angle of the rotating encoder disk in relation to the fixed read heads.

Azimuth motor assembly 2125 includes azimuth motor rotor 2126 and azimuth motor stator 2127. Azimuth motor rotor comprises permanent magnets attached directly to the shaft of yoke housing 2142. Azimuth motor stator 2127 comprises field windings that generate a prescribed magnetic field. This magnetic field interacts with the magnets of azimuth motor rotor 2126 to produce the desired rotary motion. Azimuth motor stator 2127 is attached to post frame 2112.

Azimuth circuit boards 2135 represent one or more circuit boards that provide electrical functions required by azimuth components such as the encoder and motor. Azimuth slip ring assembly 2130 includes outer part 2131 and inner part 2132. In an embodiment, wire bundle 2138 emerges from auxiliary unit processor 50. Wire bundle 2138 may carry power to the tracker or signals to and from the tracker. Some of the wires of wire bundle 2138 may be directed to connectors on circuit boards. In the example shown in FIG. 10, wires are routed to azimuth circuit board 2135, encoder read head assembly 2122, and azimuth motor assembly 2125. Other wires are routed to inner part 2132 of slip ring assembly 2130. Inner part 2132 is attached to post assembly 2110 and consequently remains stationary. Outer part 2131 is attached to yoke assembly 2140 and consequently rotates with respect to inner part 2132. Slip ring assembly 2130 is designed to permit low impedance electrical contact as outer part 2131 rotates with respect to the inner part 2132.

Zenith assembly 2140 comprises yoke housing 2142, zenith encoder assembly 2150, left and right zenith bearings 2144A, 2144B, zenith motor assembly 2155, zenith slip ring assembly 2160, and zenith circuit board 2165.

The purpose of zenith encoder assembly 2150 is to accurately measure the angle of rotation of payload frame 2172 with respect to yoke housing 2142. Zenith encoder assembly 2150 comprises zenith encoder disk 2151 and zenith read-head assembly 2152. Encoder disk 2151 is attached to payload housing 2142, and read head assembly 2152 is attached to yoke housing 2142. Zenith read head assembly 2152 comprises a circuit board onto which one or more read heads are fastened. Laser light sent from read heads reflect off fine grating lines on encoder disk 2151. Reflected light picked up by detectors on encoder read head(s) is processed to find the angle of the rotating encoder disk in relation to the fixed read heads.

Zenith motor assembly 2155 comprises azimuth motor rotor 2156 and azimuth motor stator 2157. Zenith motor rotor 2156 comprises permanent magnets attached directly to the shaft of payload frame 2172. Zenith motor stator 2157 comprises field windings that generate a prescribed magnetic field. This magnetic field interacts with the rotor magnets to produce the desired rotary motion. Zenith motor stator 2157 is attached to yoke frame 2142.

Zenith circuit board 2165 represents one or more circuit boards that provide electrical functions required by zenith components such as the encoder and motor. Zenith slip ring assembly 2160 comprises outer part 2161 and inner part 2162. Wire bundle 2168 emerges from azimuth outer slip ring 2131 and may carry power or signals. Some of the wires of wire bundle 2168 may be directed to connectors on circuit board. In the example shown in FIG. 10, wires are routed to zenith circuit board 2165, zenith motor assembly 2150, and encoder read head assembly 2152. Other wires are routed to inner part 2162 of slip ring assembly 2160. Inner part 2162 is attached to yoke frame 2142 and consequently rotates in azimuth angle only, but not in zenith angle. Outer part 2161 is attached to payload frame 2172 and consequently rotates in both zenith and azimuth angles. Slip ring assembly 2160 is designed to permit low impedance electrical contact as outer part 2161 rotates with respect to the inner part 2162. Payload assembly 2170 includes a main optics assembly 2180 and a secondary optics assembly 2190.

Figure 11:
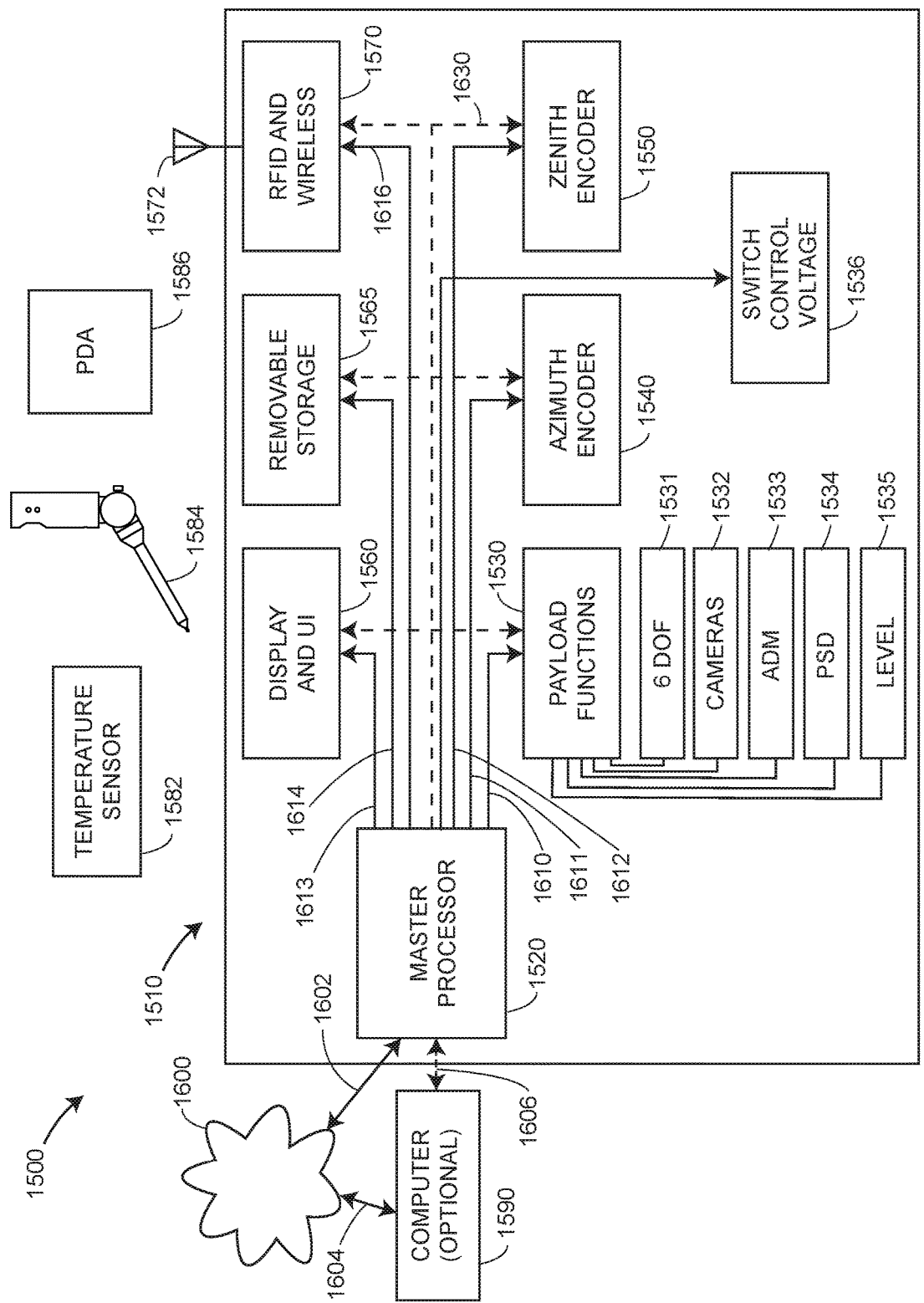
FIG. 11 is a block diagram of the computing and communication elements of a laser tracker in accordance with an embodiment of the present invention.

FIG. 11 is a block diagram depicting a dimensional measurement electronics processing system 1500 that includes a laser tracker electronics processing system 1510, processing systems of peripheral elements 1582, 1584, 1586, computer 1590, and other networked components 1600, represented here as a cloud. Exemplary laser tracker electronics processing system 1510 includes a master processor 1520, payload functions electronics 1530, azimuth encoder electronics 1540, zenith encoder electronics 1550, display and user interface (UI) electronics 1560, removable storage hardware 1565, radio frequency identification (RFID) electronics, and an antenna 1572. The payload functions electronics 1530 includes a number of subfunctions including the six-DOF electronics 1531, the camera electronics 1532, the ADM electronics 1533, the position detector (PSD) electronics 1534, and the level electronics 1535. Most of the subfunctions have at least one processor unit, which might be a digital signal processor (DSP) or field programmable gate array (FPGA), for example. The electronics units 1530, 1540, and 1550 are separated as shown because of their location within the laser tracker. In an embodiment, the payload functions 1530 are located in the payload 2170 of FIGS. 9, 10, while the azimuth encoder electronics 1540 is located in the azimuth assembly 2110 and the zenith encoder electronics 1550 is located in the zenith assembly 2140.

Many types of peripheral devices are possible, but here three such devices are shown: a temperature sensor 1582, a six-DOF probe 1584, and a personal digital assistant, 1586, which might be a smart phone, for example. The laser tracker may communicate with peripheral devices in a variety of means, including wireless communication over the antenna 1572, by means of a vision system such as a camera, and by means of distance and angular readings of the laser tracker to a cooperative target such as the six-DOF probe 1584. Peripheral devices may contain processors. The six-DOF accessories may include six-DOF probing systems, six-DOF scanners, six-DOF projectors, six-DOF sensors, and six-DOF indicators. The processors in these six-DOF devices may be used in conjunction with processing devices in the laser tracker as well as an external computer and cloud processing resources. Generally, when the term laser tracker processor or measurement device processor is used, it is meant to include possible external computer and cloud support.

In an embodiment, a separate communications bus goes from the master processor 1520 to each of the electronics units 1530, 1540, 1550, 1560, 1565, and 1570. Each communications line may have, for example, three serial lines that include the data line, clock line, and frame line. The frame line indicates whether or not the electronics unit should pay attention to the clock line. If it indicates that attention should be given, the electronics unit reads the current value of the data line at each clock signal. The clock-signal may correspond, for example, to a rising edge of a clock pulse. In an embodiment, information is transmitted over the data line in the form of a packet. In an embodiment, each packet includes an address, a numeric value, a data message, and a checksum. The address indicates where, within the electronics unit, the data message is to be directed. The location may, for example, correspond to a processor subroutine within the electronics unit. The numeric value indicates the length of the data message. The data message contains data or instructions for the electronics unit to carry out. The checksum is a numeric value that is used to minimize the chance that errors are transmitted over the communications line.

In an embodiment, the master processor 1520 sends packets of information over bus 1610 to payload functions electronics 1530, over bus 1611 to azimuth encoder electronics 1540, over bus 1612 to zenith encoder electronics 1550, over bus 1613 to display and UI electronics 1560, over bus 1614 to removable storage hardware 1565, and over bus 1616 to RFID and wireless electronics 1570.

In an embodiment, master processor 1520 also sends a synch (synchronization) pulse over the synch bus 1630 to each of the electronics units at the same time. The synch pulse provides a way of synchronizing values collected by the measurement functions of the laser tracker. For example, the azimuth encoder electronics 1540 and the zenith electronics 1550 latch their encoder values as soon as the synch pulse is received. Similarly, the payload functions electronics 1530 latch the data collected by the electronics contained within the payload. The six-DOF, ADM, and position detector all latch data when the synch pulse is given. In most cases, the camera and inclinometer collect data at a slower rate than the synch pulse rate but may latch data at multiples of the synch pulse period.

The azimuth encoder electronics 1540 and zenith encoder electronics 1550 are separated from one another and from the payload electronics 1530 by the slip rings 2130, 2160 shown in FIGS. 9, 10. This is why the bus lines 1610, 1611, and 1612 are depicted as separate bus line in FIG. 11.

The laser tracker electronics processing system 1510 may communicate with an external computer 1590, or it may provide computation, display, and UI functions within the laser tracker. The laser tracker communicates with computer 1590 over communications link 1606, which might be, for example, an Ethernet line or a wireless connection. The laser tracker may also communicate with other elements 1600, represented by the cloud, over communications link 1602, which might include one or more electrical cables, such as Ethernet cables, and one or more wireless connections. An example of an element 1600 is another three dimensional test instrument—for example, an articulated arm CMM, which may be relocated by the laser tracker. A communication link 1604 between the computer 1590 and the elements 1600 may be wired (e.g., Ethernet) or wireless. An operator sitting on a remote computer 1590 may make a connection to the Internet, represented by the cloud 1600, over an Ethernet or wireless line, which in turn connects to the master processor 1520 over an Ethernet or wireless line. In this way, a user may control the action of a remote laser tracker.

Laser trackers today use one visible wavelength (usually red) and one infrared wavelength for the ADM. The red wavelength may be provided by a frequency stabilized helium-neon (HeNe) laser suitable for use in an interferometer and also for use in providing a red pointer beam. Alternatively, the red wavelength may be provided by a diode laser that serves just as a pointer beam. A disadvantage in using two light sources is the extra space and added cost required for the extra light sources, beam splitters, isolators, and other components. Another disadvantage in using two light sources is that it is difficult to perfectly align the two light beams along the entire paths the beams travel. This may result in a variety of problems including inability to simultaneously obtain good performance from different subsystems that operate at different wavelengths. A system that uses a single light source, thereby eliminating these disadvantages, is shown in optoelectronic system 500 of FIG. 12A.

Figure 12A:
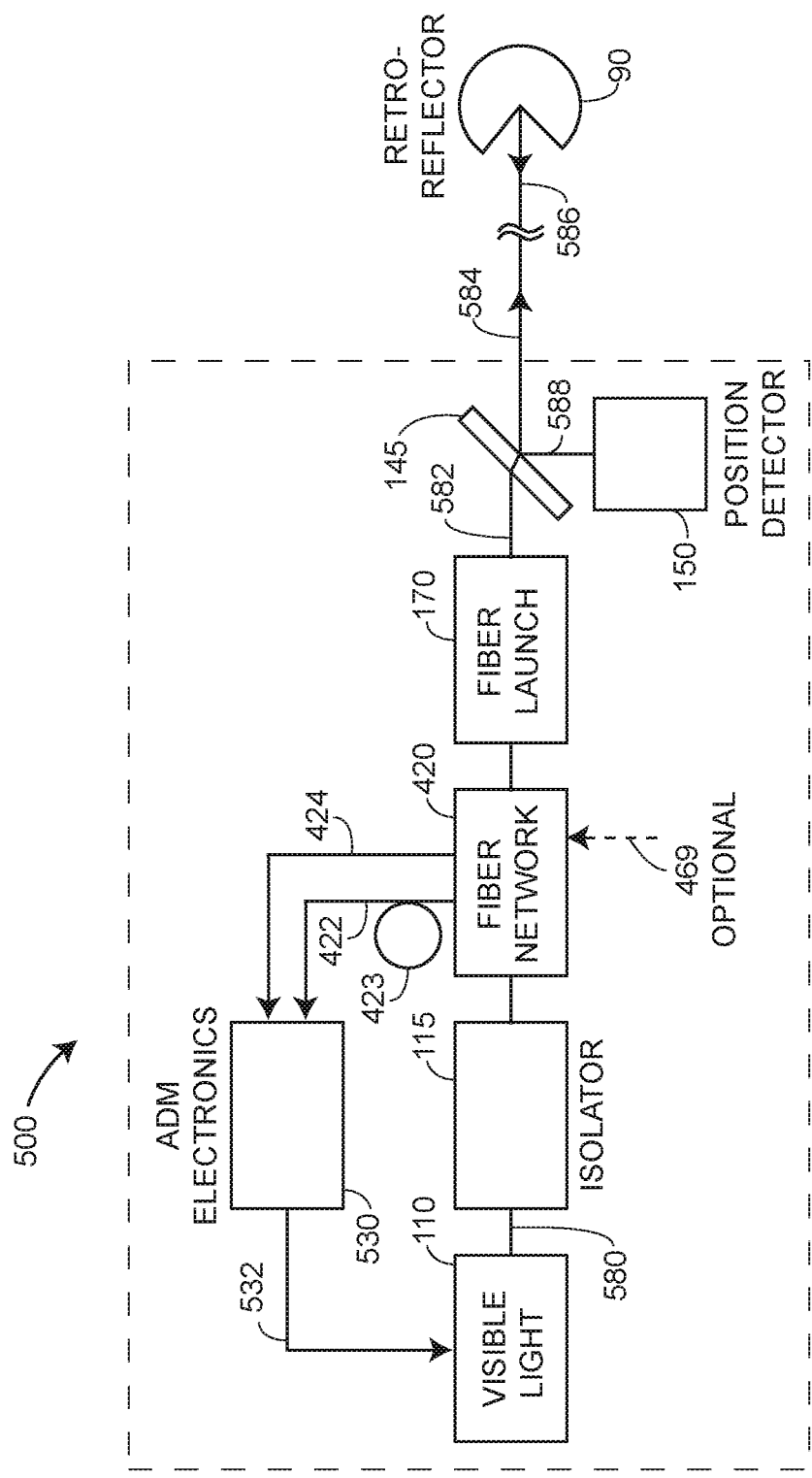
FIG. 12A is a block diagram of elements in a laser tracker that uses a single wavelength according to an embodiment of the present invention.

FIG. 12A includes a visible light source 110, an isolator 115, a fiber network 420, ADM electronics 530, a fiber launch 170, a beam splitter 145, and a position detector 150. The visible light source 110 might be, for example, a red or green diode laser or a vertical cavity surface emitting laser (VCSEL). The isolator might be a Faraday isolator, an attenuator, or any other device capable of sufficiently reducing the amount of light fed back into the light source. The light from the isolator 115 travels into the fiber network 420, which in an embodiment is the fiber network 420A of FIG. 8A.

Figure 12B:
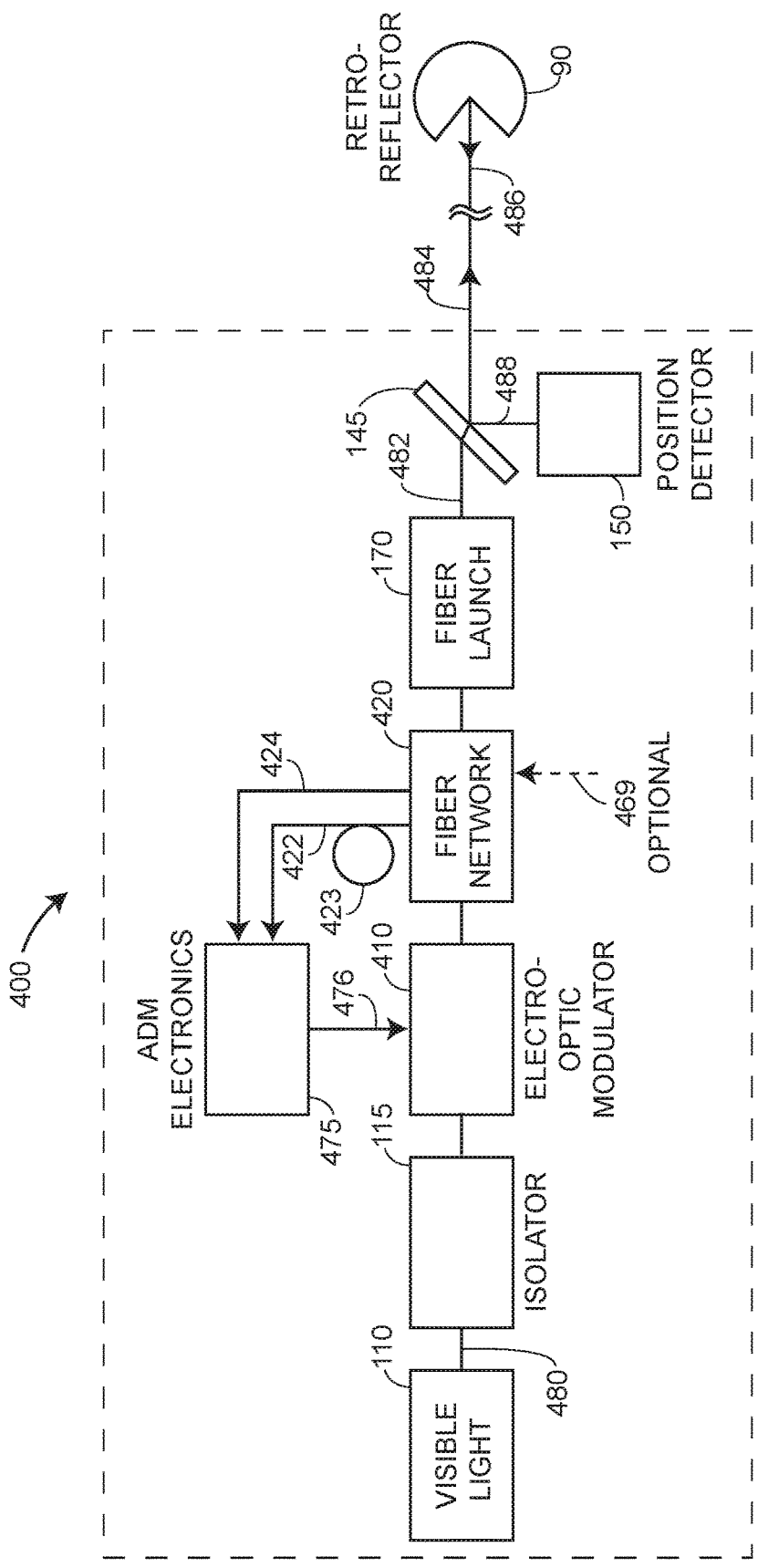
FIG. 12B is a block diagram of elements in a laser tracker that uses a single wavelength according to an embodiment of the present invention.

FIG. 12B shows an embodiment of an optoelectronic system 400 in which a single wavelength of light is used but wherein modulation is achieved by means of electro-optic modulation of the light rather than by direct modulation of a light source. The optoelectronic system 400 includes a visible light source 110, an isolator 115, an electrooptic modulator 410, ADM electronics 475, a fiber network 420, a fiber launch 170, a beam splitter 145, and a position detector 150. The visible light source 110 may be, for example, a red or green laser diode. Laser light is sent through an isolator 115, which may be a Faraday isolator or an attenuator, for example. The isolator 115 may be fiber coupled at its input and output ports. The isolator 115 sends the light to the electrooptic modulator 410, which modulates the light to a selected frequency, which may be up to 10 GHz or higher if desired. An electrical signal 476 from ADM electronics 475 drives the modulation in the electrooptic modulator 410. The modulated light from the electrooptic modulator 410 travels to the fiber network 420, which might be the fiber network 420A, 420B, 420C, or 420D discussed hereinabove. Some of the light travels over optical fiber 422 to the reference channel of the ADM electronics 475. Another portion of the light travels out of the tracker, reflects off retroreflector 90, returns to the tracker, and arrives at the beam splitter 145. A small amount of the light reflects off the beam splitter and travels to position detector 150, which has been discussed hereinabove with reference to FIGS. 6A-F. A portion of the light passes through the beam splitter 145 into the fiber launch 170, through the fiber network 420 into the optical fiber 424, and into the measure channel of the ADM electronics 475. In general, the system 500 of FIG. 12A can be manufactured for less money than system 400 of FIG. 12B; however, the electro-optic modulator 410 may be able to achieve a higher modulation frequency, which can be advantageous in some situations.

Figure 13:
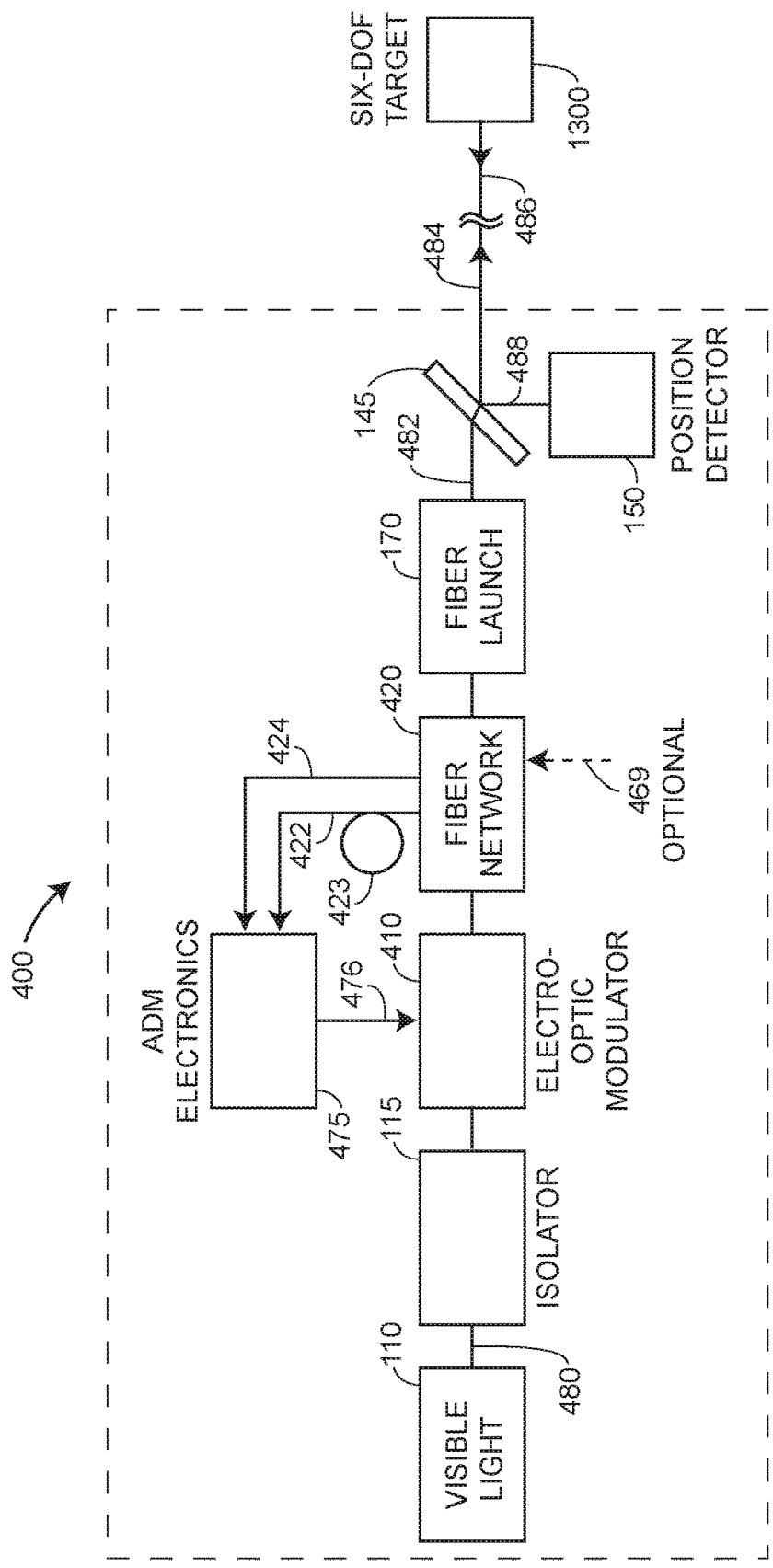
FIG. 13 is a block diagram of elements in a laser tracker with six-DOF capability according to an embodiment of the present invention.

FIG. 13 shows an embodiment of a laser tracker combined with a six-DOF target probe 1300 according to an embodiment. The tracker 400 of FIG. 12B used to measure an SMR may also be used to measure the six-DOF target 1300 of FIG. 13.

The three orientational degrees of freedom may be determined using a six-DOF probe, as described herein below. The three translational degrees of freedom and the three orientational degrees of freedom fully define the position and orientation of the six-DOF probe 1300 in space. It is important to note that this is the case for the systems considered here because it is possible to have systems in which the six degrees of freedom are not independent so that six degrees of freedom are not sufficient to fully define the position of a position and orientation in space. The term "translational set" is a shorthand notation for three degrees of translational freedom of a six-DOF accessory (such as a six-DOF probe) in the tracker frame-of-reference (or device frame of reference). The term "orientational set" is a shorthand notation for three orientational degrees of freedom of a six-DOF accessory in a tracker frame of reference. The term "surface set" is a shorthand notation for three-dimensional coordinates of a point on the object surface in a device frame of reference.

FIG. 14 shows a six-DOF probe 1300 according to the present invention. The six-DOF probe 1300 includes a housing 1305, a retroreflector 1310, a camera 1320, an inclinometer 1330, a processor 1340, and an antenna 1350. In an embodiment, the retroreflector 1310 is a cube-corner retroreflector, but other types of retroreflectors may be used. In an embodiment, the camera 1320 includes a lens 1322, a photosensitive array 1324, and camera electronics 1326. The lens 1322 is configured to receive light over a field-of-view 1328 and form an image on the photosensitive array 1324. The camera electronics sends digital data from the captured image to the processor 1340. In an embodiment, the photosensitive array 1324 is a CMOS or CCD array. The processor receives information from the inclinometer 1330 and the camera electronics 1326. The processor may send raw or partially processed data to the tracker 10 or external computer 60 through the antenna 1350. The six-DOF probe 1300 may also receive instructions from the tracker 10. Alternatively, the processor 1340 may calculate the three orientational degrees of freedom of the six-DOF probe 1300 and send this information to the tracker 10. The six-DOF probe may also receive the three translational degrees of freedom from the tracker (for example, Cartesian coordinates x, y, and z or spherical coordinates r, phi, and theta). The processor 1340 may use the three translational degrees of freedom, the information from the camera electronics 1326 and inclinometer 1330, and compensation information, which might for example relate to characteristics of a tactile or scanning probe attached to the six-DOF probe 1300, to determine 3D coordinates of one or more points of the object being measured.

FIGS. 15A and 15B show side and top views of a two-axis inclinometer circuit 1330A that includes a circuit board 1332 having a first one-axis inclinometer 1334 and a second one-axis inclinometer 1336 placed at right angles to the first, thereby providing inclination information along a two perpendicular axes of a plane (e.g., x and y). FIGS. 15C and 15D show side and top views of a two-axis inclinometer circuit 1330B that includes a circuit board 1302 having a single two-axis inclinometer 1304.

Figure 16:
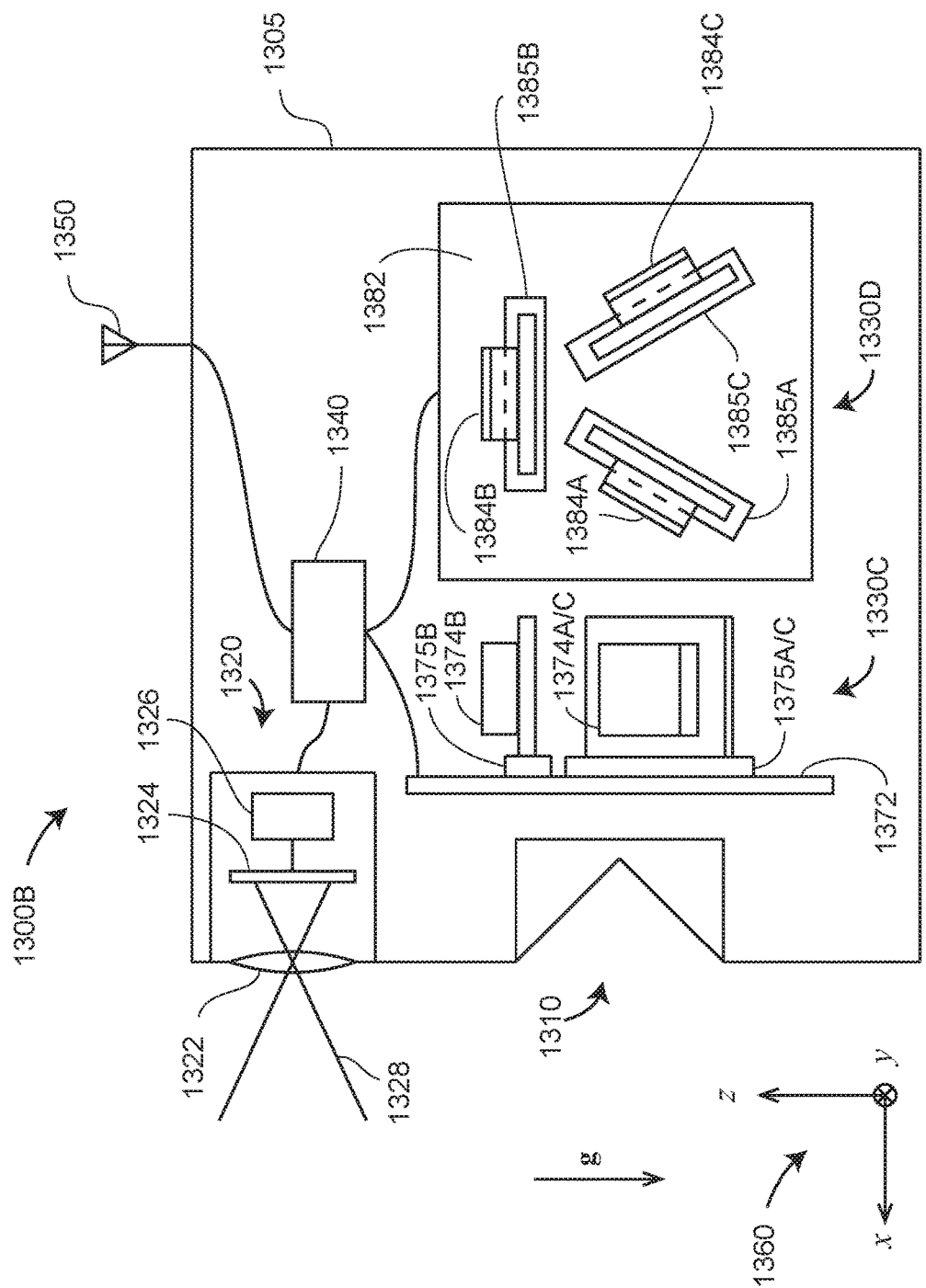
FIG. 16 is a schematic representation of a six-DOF sensor according to an embodiment of the present invention.

FIG. 16 shows a six-DOF probe 1300B, which includes inclinometers having the ability to determine pitch angle over 360 degrees and roll angle over 360 degrees. The position and orientation of the six-DOF probe 1300B are defined in terms of the frame of reference 1360, which is tied to the probe 1300B. The z axis of the frame of reference 1360 is directed opposite the gravity vector. The x, y, and z axes are mutually perpendicular. The z axis is directed opposite the gravity vector g, and the x axis points away from the front of the six-DOF probe 1300B.

The pitch angle is determined from readings provided by the inclinometer sensors 1384A, 1384B, and 1384C mounted on daughter boards that fit into connectors 1385A, 1385B, and 1385C affixed perpendicular to the motherboard 1382. In an embodiment, the inclination sensors are muRata SCA103T single-axis inclinometers. In an embodiment, each inclinometer is selected to measure over +/−30 degrees, with inclinometers spaced apart by 60 degrees. The inclinometers measure right-side up or upside down, and so three inclinometers are sufficient to cover 360 degrees. In an alternative embodiment, each inclinometer is selected to cover+/−15 degrees, and six devices are used to cover 360 degrees.

The inclinometer sensors 1384A, 1384B, and 1384C on the pitch assembly indicate an angle of rotation in the x-z plane, which is the same thing as an angle of rotation about the y axis. The inclinometer sensors are designed to reject the influence of rotation about the x (roll) axis, but there is some cross-axis sensitivity. Compensation procedures are needed to reduce systematic errors, including cross-axis errors.

The roll angle is determined from readings provided by the inclinometer sensors 1374A, 1374B, and 1374C mounted on daughter boards that fit into connectors 1375A, 1375B, and 1375C affixed perpendicular to the motherboard 1372. In an embodiment, the inclinometer sensors are of the same type as those used in the pitch assembly 1330D. The inclinometer sensors 1374A, 1374B, and 1374C on the roll assembly 1330C indicate an angle of rotation in the y-z plane, which is the same thing as an angle of rotation about the x axis. The inclinometer sensors are designed to reject the influence of rotation about the y (pitch) axis, but there is some cross-axis sensitivity. As explained herein above, compensation procedures are needed to reduce cross-axis errors. A small correction is made to account for any deviation in perpendicularity between the roll assembly 1330C and the pitch assembly 1330D. The correction may be made in software by the processor 1340 or by the electronics processing system 1500 of the tracker.

Figure 17:
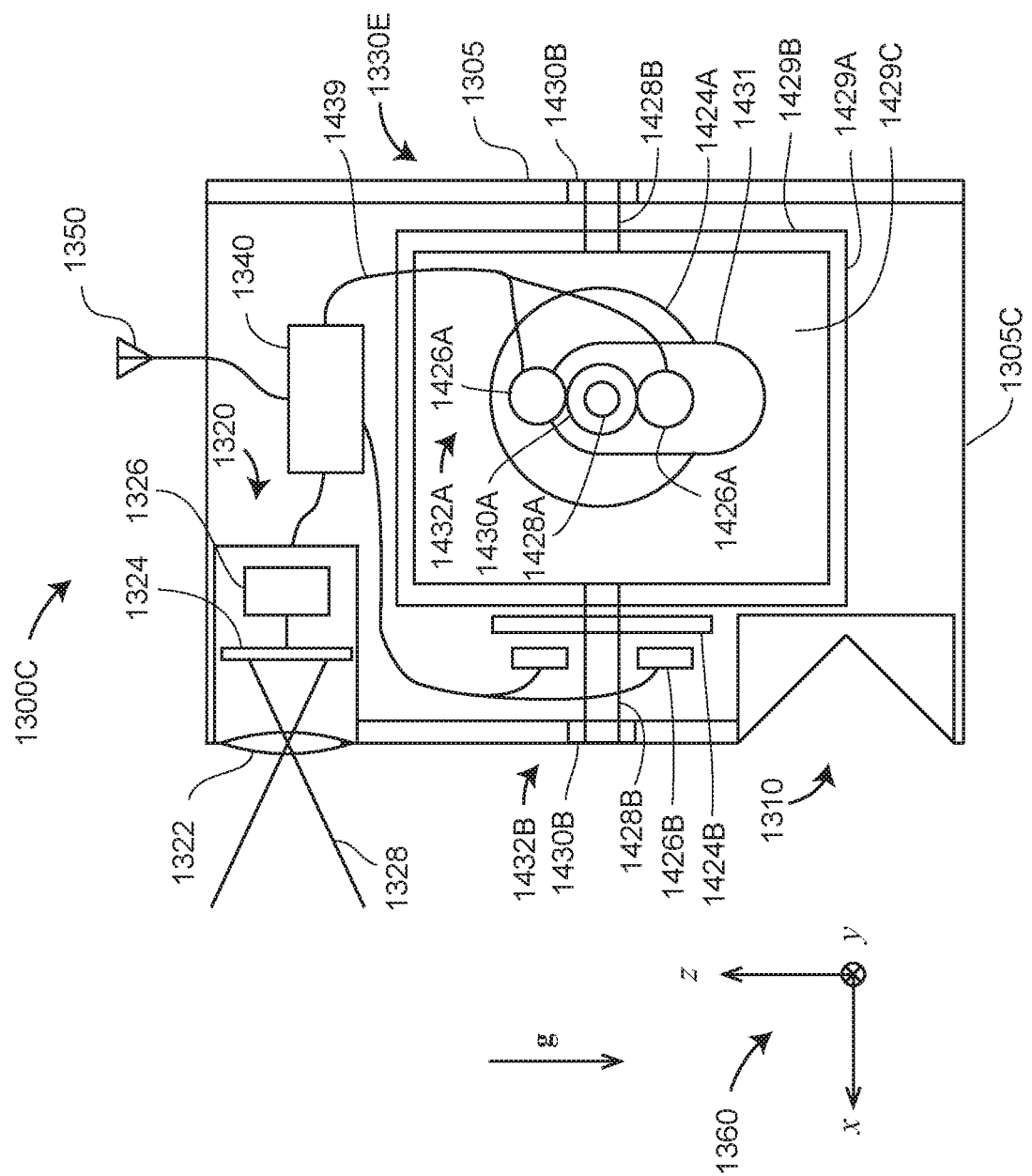
FIG. 17 is a schematic representation of a six-DOF sensor according to an embodiment of the present invention.

FIG. 17 shows a more accurate way to measure pitch angle over 360 degrees and roll angle over 360 degrees. The six-DOF probe 1300C includes a two-axis pendulum 1330E having two angular encoders, one to measure the pitch angle and the other to measure the roll angle. Roll-axle segments 1428B attach to housing 1305C with a pair of bearings 1430B. The other ends of roll-axle segments 1428B attach fixedly to side walls 1429B of an inner box 1429A. A pitch axle 1428A sits inside a pair of bearings 1430A which attach to front/back walls 1429C. A pendulum 1431, which is weighted toward its bottom, is attached to the pitch axle 1428A. Gravity keeps the weighted end of the pendulum turned downward on the low-friction bearings 1428A as the six-DOF probe 1300C is pitched forward and backward. The pitch angle is measured by the angular encoder 1432A, which in an embodiment includes disk 1424A and one or more read heads 1426A. In an embodiment, the disk is fixedly attached to the pitch axle 1428A and the read heads 1426A are attached to the inner box 1429C. As the pendulum turns the pitch axle, the encoder disk turns relative to the read heads. In the example shown in FIG. 17, the read heads are of the reflective type that both project light onto the disk and receive light reflected by the disk. In an embodiment, the disk includes a large number of markings spaced around the periphery of the disk. The read heads record the movement of the markings to measure the angle of rotation of the pitch axle. With proper compensation, an accuracy of 5 to 10 microradians may be measured with such an angular encoder. In other embodiments, the read heads may project light from one side of the disk and receive it on the other side of the disk. In other embodiments, a different number of read heads is used.

In the embodiment of FIG. 17, the electrical signals from the read heads are sent over wires 1439 through an upper portion of the inner box 1429A. By loosely wrapping a number of loops of wire around the inner box 1429A, several rotations of the inner box may be achieved before the wires bind up. An alternative that prevents the possibility that the wires will bind up is to run the wires to a slip ring in which wires are attached to one side on a rotating portion and on the other side to a fixed portion.

As the six-DOF probe 1300C is rolled to the side, the inner box rotates about the bearings 1430B. An encoder disk 1424B is fixedly attached to the disk and rotates relative to the read heads 1426B, which are attached to the frame 1305C. In an embodiment, electrical signals from the read heads are evaluated by the processor 1340 to determine the angle of rotation of the inner box 1429A relative to the frame 1305C. In other words, the angular encoder 1432B measures the roll angle, and the angular encoder 1432A measures the pitch angle of the six-DOF probe 1300C.

The inclinometer 1330 provides information on the pitch and roll angles of the six-DOF probe 1300 relative to the gravity vector. The inclinometer does not, however, ordinarily provide information on the yaw angle of the six-DOF probe since the yaw angle is ordinarily an angle of rotation about a vertical axis, which is the same in this case as the gravity vector. Consequently to fully understand the position of the six-DOF probe 1300 in relation to the laser tracker 10, an alternative method is needed to determine the yaw angle.

Figure 18A:
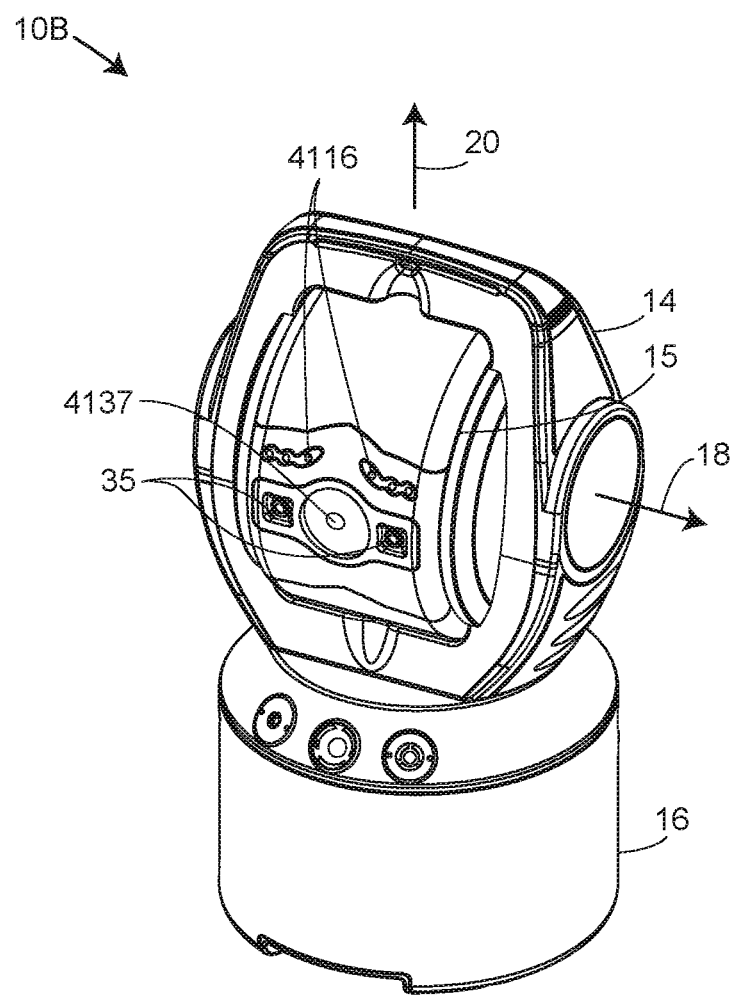
FIG. 18A is a perspective view of a laser tracker in accordance with an embodiment of the present invention.

A way to determine the yaw angle is to use the camera 1320 to form an image of a light on the tracker and from this image to extract the yaw angle. There are several possible lights on the tracker that may be used for this purpose, as shown in FIG. 18A. In an embodiment, the tracker 10 emits a beam of light that reflects off the retroreflector 1310, returns to the tracker, and reflects (scatters) off a tracker window as light 4137. Because the vector from the tracker gimbal point to the six-DOF probe is known (since the tracker measures the distance and two angles from the tracker to the retroreflector 1310), the direction from the tracker to the probe can be easily determined. Other lights that may be used include any of the indicator lights 4116 or one of the infrared illuminator lights 35 adjacent to a locator camera.

In an embodiment, the camera 1320 includes a lens coated to pass light at the wavelengths of the laser tracker and to block other wavelengths. For example, the lens may be coated with a thin film that permits only red light from around 1625 nm to 1645 nm to pass onto the photosensitive array. This makes it easier for the camera 1320 to see the scattered light 4137 in the presence of relatively bright background light.

FIGS. 18B, 18C, and 18D illustrate front, side, and top views of camera elements including the lens 1805 and photosensitive array 1810. The lens 1805 has a perspective center 1817 through which a ray of light appears to pass before arriving at the array at the position 1840. The spot of light at the array 1810 has coordinates $a_x$, $a_y$ on the array.

The position of the spot of light 1840 on the array depends on the pitch, roll, and yaw of the six-DOF probe 1300, the 3D vector components of the retroreflector 1310 relative to the tracker gimbal point, and the position of the camera 1320 relative to the retroreflector 1310. The light spot imaged by the camera may be repositioned mathematically to remove the effects of the pitch and roll angles measured by the inclinometer 1330 and the effects of the 3D vector components measured by the tracker 10. In other words, all of the influence quantities may be determined and removed from the image of the spot 1840 except for the effect of the yaw angle. The yaw angle may then be determined from the corrected spot position.

To determine the orientation of the six-DOF probe 1300 referenced to gravity, the inclinometer of the tracker may be used to measure the pitch and roll angles of the tracker relative to gravity. The type of mathematical correction made to account for the effects of the tracker roll angle and probe roll angle is indicated schematically by the rotation 1850 in FIG. 18B.

The angle 1835 is the angle of incidence as seen from the side view. The angle of incidence is defined as the angle of a ray of light relative to optical axis, which in this case is represented by the direction 1815. This angle accounts for the pitch angle of the tracker and the height of the tracker gimbal point relative to the height of the probe retroreflector 1310. The angle 1830 is the angle of incidence as seen from the top view. This angle accounts for mainly the yaw angle of the six-DOF probe relative to the six-DOF probe 1300.

Figure 19:
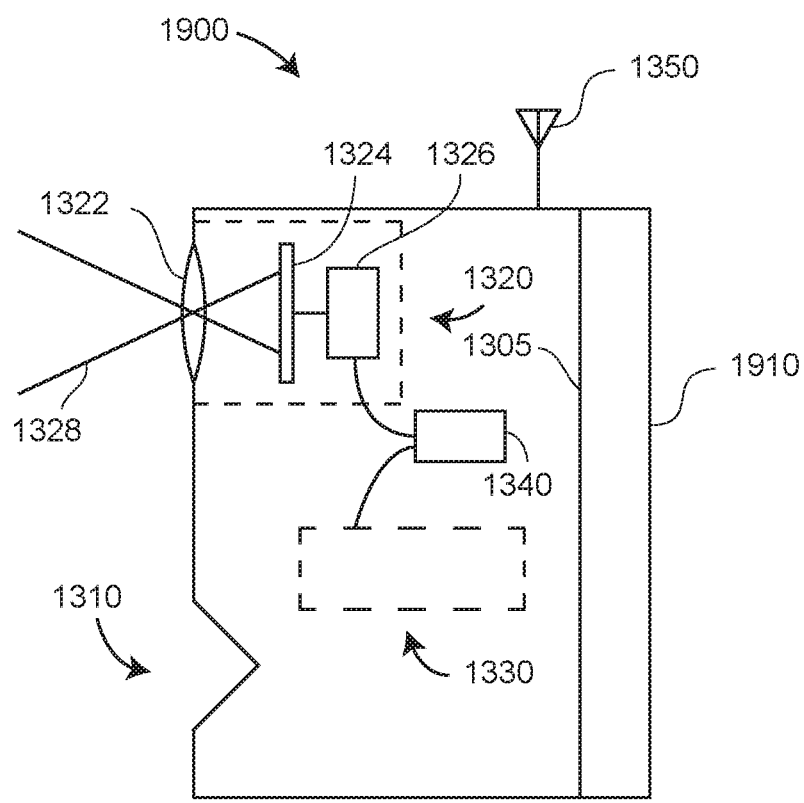
FIG. 19 is a block diagram of a six-DOF indicator in accordance with an embodiment of the present invention.

FIG. 19 is a schematic representation of a six-DOF indicator 1900, which may be used to determine the six degrees of freedom of a device to which it is attached, for example to an end effector of a robot. The attachment element 1910 may include attachment features such as tapped holes.

As discussed herein below, in many types of six-DOF probing accessories, a user may point the retroreflector 1310 at the laser tracker and the accessory held in any desired orientation as explained herein below. However, for the case in which a six-DOF indicator is attached to a robot end-effector, it may be important to provide a way to determine the six degrees of freedom for the six-DOF indicator placed in an arbitrary orientation since the user may have no control over the orientation of the end effector.

Figure 19A:
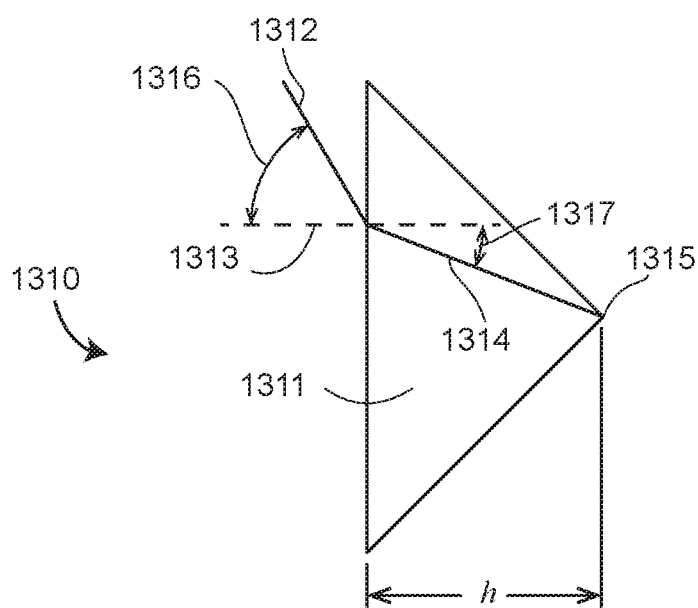
FIG. 19A illustrates the refraction of light through a glass cube-corner retroreflector.

A first step in enabling measurement of a six-DOF probe placed in an arbitrary orientation is to increase the effective field-of-view (FOV) of the retroreflector 1310. A technique that can be used to accomplish this is to replace the open-air retroreflector with one made of solid glass. In an embodiment shown in FIG. 19A, the retroreflector is a cube-corner retroreflector 1310 made of glass 1311. A ray of light 1312 arrives from the tracker and enters the glass surface of the retroreflector 1310. It refracts inward as ray 1314, arriving at the retroreflector vertex 1315. The angle of incidence 1316 of the ray of light 1312 in air is given with respect to the line 1313 perpendicular to the front face of the cube-corner retroreflector. The angle of incidence 1317 of the ray of light 1314 inside the glass may be determined from Snell's law, which states that for an angle 1316 denoted $a_1$, and angle 1317 denoted $a_2$, and glass index of refraction n, the following relation holds: $\sin(a_1)=n \sin(a_2)$. When a glass retroreflector is used, a processor is used to correct for the position of the vertex 1315 relative to the tracker 10. In other words, the position of the vertex is determined not only based on the distance and two angles measured by the tracker but also on the orientation measured by the six-DOF probe, the index of refraction of the glass, and the height h of the retroreflector.

Figure 19B:
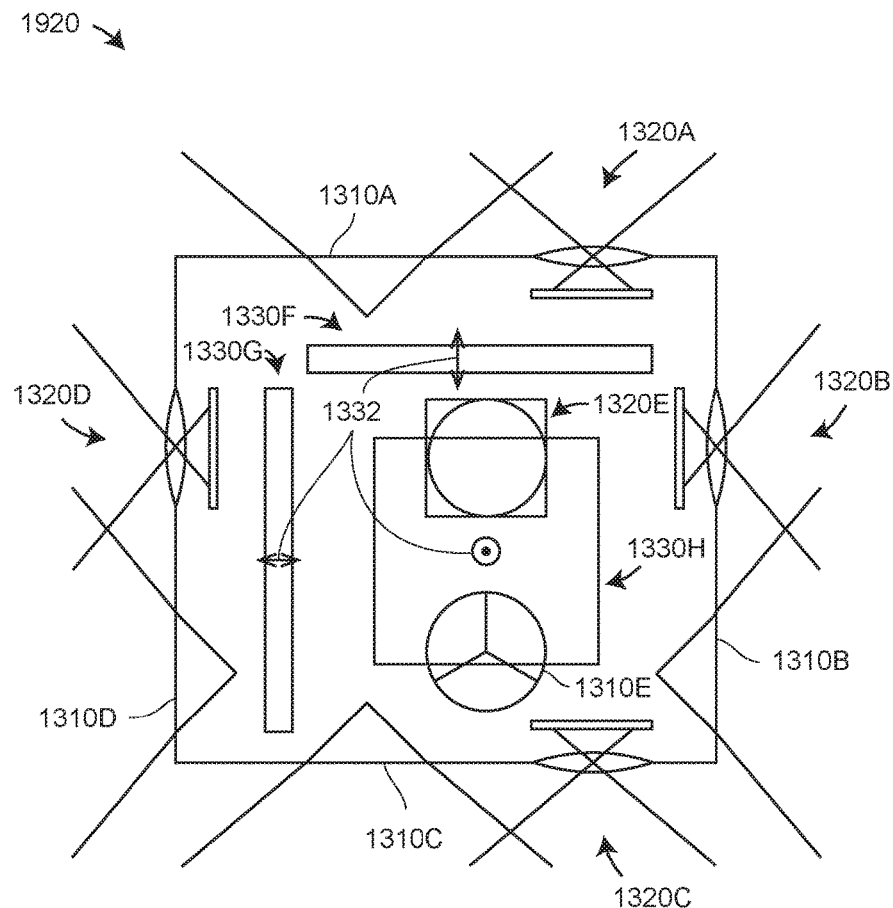
FIG. 19B is a schematic representation of a six-DOF indicator in accordance with an embodiment of the present invention.

FIG. 19B shows a schematic representation of a six-DOF indicator probe 1920 having the ability to measure six degrees-of-freedom when positioned in a wide range of orientations. The attachment element 1910 is placed on the bottom side of the six-DOF indicator probe and is not visible in FIG. 19B. Each of the other five faces of the six-DOF indicator probe 1920 includes one of the retroreflectors 1310A, 1310B, 1310C, 1310D, and 1310E. The retroreflectors are each glass retroreflectors having a FOV of approximately +/−50 degrees. Each of the five faces also includes one of the cameras 1320A, 1320B, 1320C, 1320D, and 1320E. The cameras also have a FOV of approximately +/−50 degrees. The six-DOF indicator probe 1920 includes three inclinometer sensor assemblies, 1300F, 1330G, and 1330H. The arrow 1332 for each of the three inclinometer sensor assemblies represents the axis about which an angular measurement is made. Regardless of the orientation of the six-DOF indicator probe 1920, there is always at least one of these sensor assemblies that can serve as a pitch assembly and another that can serve as a roll assembly.

Figure 20:
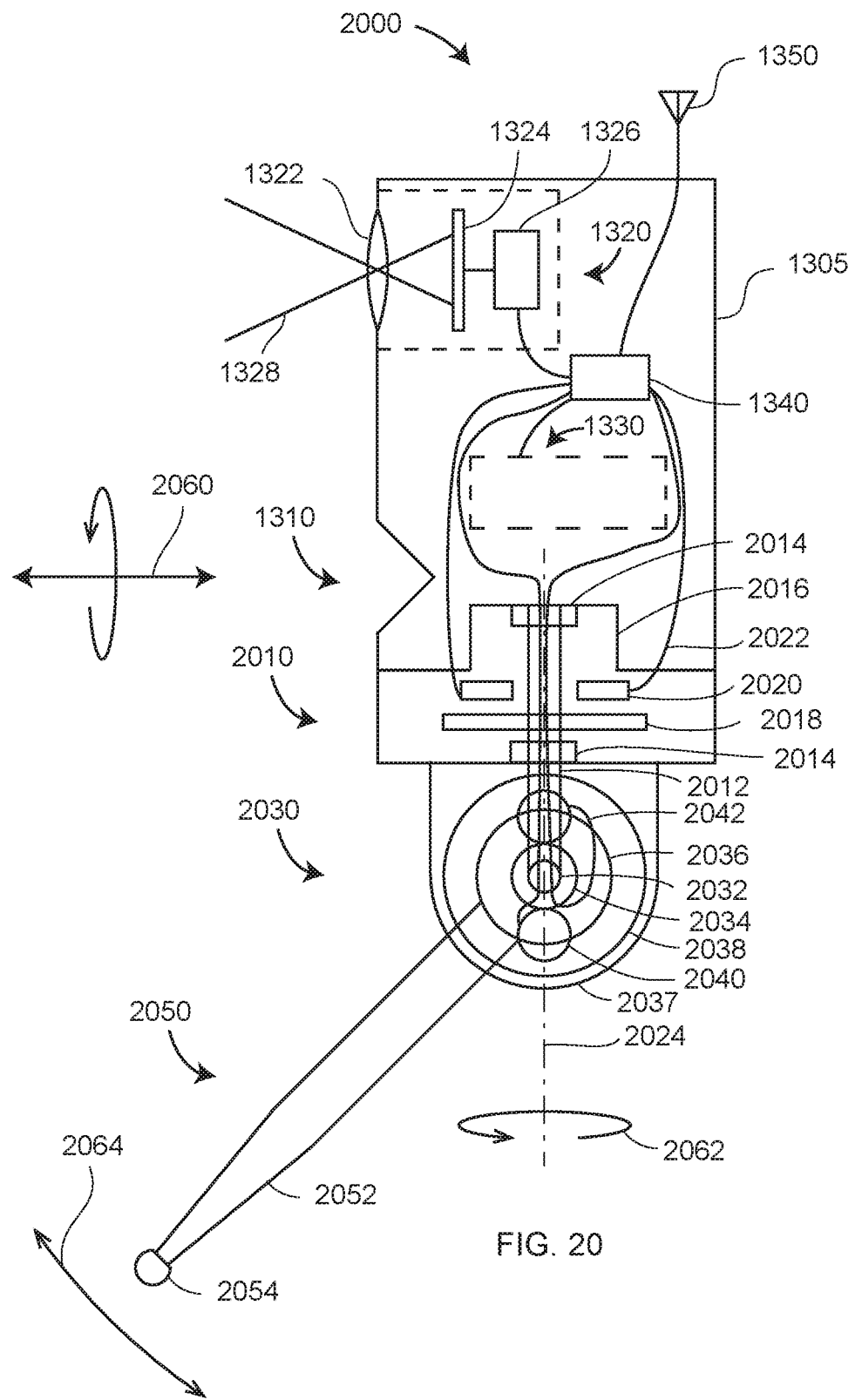
FIG. 20 is a schematic representation of a six-DOF tactile probe in accordance with an embodiment of the present invention.

FIG. 20 is a schematic representation of a six-DOF tactile probe 2000. It includes retroreflector 1310, camera 1320, inclinometer assembly 1330, processor 1340, and antenna 1350 as in embodiments described herein above. In addition, in an embodiment, it includes a first encoder assembly 2010, a second encoder assembly 2030, and a tactile probe assembly 2050. In an embodiment, the first encoder assembly 2010 includes an axle 2012, two bearings 2014, a mounting block 2016, an encoder disk 2018, one or more read heads 2020, and electrical wires 2022 running from the read heads to the processor 1340. In an embodiment, axle 2012 turns on bearings 2014, which are seated within mounting block 2014. The encoder disk 2016 is fixedly attached to axle 2012, and read heads 2018 are fixedly attached to the mounting block 2016. The encoder disk 2018 rotates about the axis 2024. The electrical signals from the read heads 2020 are sent over wires 2022 to processor 1340, which evaluates the signals to determine the angle of rotation of the encoder disk 2014 and axle 2012 about the axis 2024.

In an embodiment, the second encoder assembly includes an axle 2032, two bearings 2034, an inner mounting block 2036, an outer mounting block 2037, an encoder disk 2038, one or more read heads 2040, and electrical wires 2042 running from the read heads to the processor 1340. The axle 2032 turns on bearings 2034, which are seated within inner mounting block 2036, which is affixed to outer mounting block 2037. The encoder disk 2036 is fixedly attached to axle 2032, and read heads 2040 are fixedly attached to the mounting block 2036. In an embodiment, the electrical signals from the read heads 2040 are sent over wires 2042 through hollow axle 2012 to processor 1340, which evaluates the signals to determine the angle of rotation of the encoder disk 2034 and axle 2032.

In an embodiment, the tactile probe assembly 2050 includes a probe shaft 2052 and a probe tip 2054. The probe shaft 2052 is attached to inner mounting structure 2036. The processor 1340 or one of the processors in the tracker is configured to determine 3D coordinates of the center of the probe tip 2054 based on the three translational degrees of freedom measured by the laser tracker 10 and by the three orientational degrees of freedom measured by the six-DOF probe 2000.

In an embodiment, a laser tracker 10 may steer a beam of light out of the tracker about the zenith axis 18 with a resulting angle relative to a horizontal plane of approximately −52 degrees to +78 degrees. Because the inclination measuring assemblies such as assembly 1330D and 1330E have the ability to measure pitch angles over 360 degrees, the retroreflector 1310 of the six-DOF tactile probe 2000 may be pointed in the direction of any laser beam emitted by the laser tracker. Furthermore, because the inclination measuring assemblies such as assembly 1330C and 1330E have the ability to measure roll angles over 360 degrees, the six-DOF tactile probe 2000 may be rotated to any angle about the axis 2060. In other words, the probe tip 2054 may be rotated about the axis 2060 to point below, above, or to the side of the body 1305. The additional degree of rotational freedom 2062 provided by the first encoder assembly 2010 permits the probe to be rotated to the front, back, or side of the body 1305 relative to the retroreflector 1310. The additional degree of rotational freedom 2064 provided by the second encoder assembly 2030 permits the probe to be rotated in an arc forward, down, or backwards.

Figure 21:
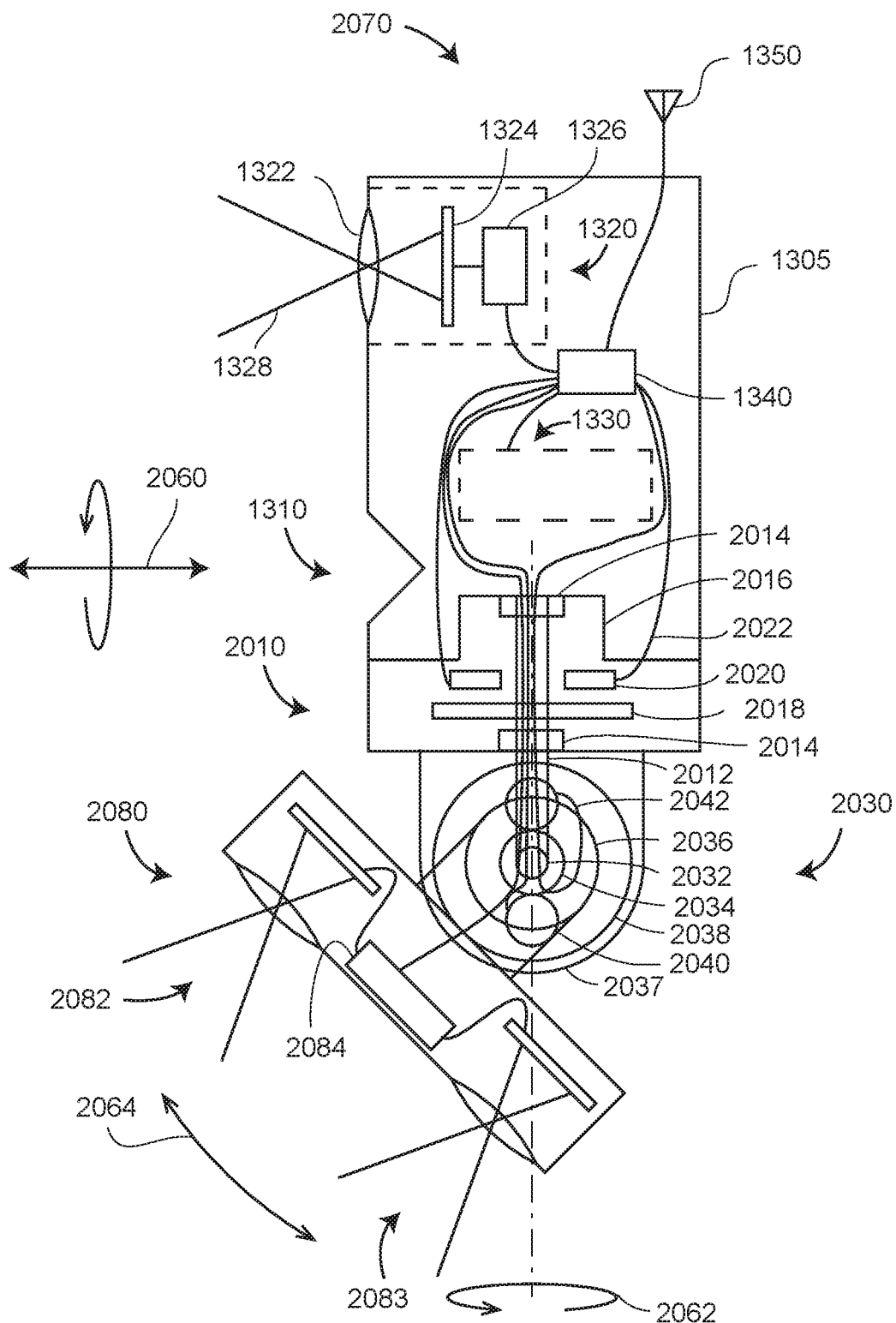
FIG. 21 is a schematic representation of a six-DOF triangulation scanner in accordance with an embodiment of the present invention.

FIG. 21 is a schematic representation of a six-DOF triangulation scanner 2070. It includes the elements of six-DOF tactile probe 2000 of FIG. 20 but replaces the tactile probe assembly 2050 with a triangulation scanner assembly 2080. In an embodiment, the triangulation scanner includes a projector 2082, a camera 2084, and a processor 2084. The triangulation scanner may be rotated to a wide variety of positions as explained herein above for the case of the six-DOF tactile probe 2000 of FIG. 20. Many types of triangulation scanners are available. Some project a line of line, while other scanners project an area of light. Some scanners make multiple sequential measurements, while others measure in single shots. A more detailed discussion of triangulation scanners that may be used in device 2070 is given in reference to FIGS. 23A, 23B, and 23C.

Figure 22:
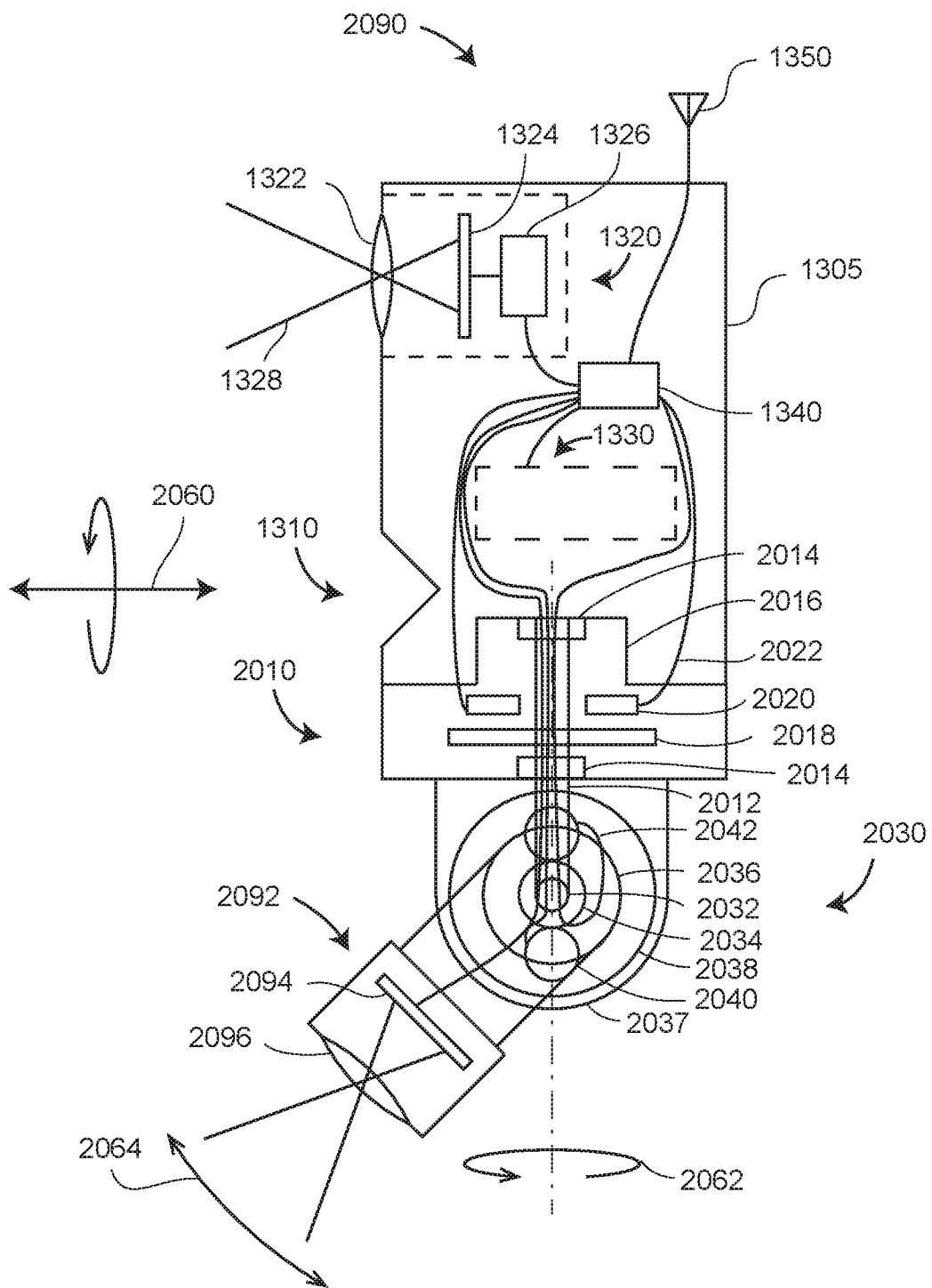
FIG. 22 is a schematic representation of a six-DOF projector in accordance with an embodiment of the present invention.

FIG. 22 is a schematic representation of a six-DOF projector 2090. It includes the elements of the six-DOF tactile probe 2000 of FIG. 20 but replaces the tactile probe assembly 2050 with a projector assembly 2092. In an embodiment, the six-DOF projector includes an illuminated pattern 2094 and a projection lens 2096. The six-DOF projector may be used to project patterns onto an object, for example, to provide a template for carrying out of assembly or machining operations. It may also project the results of measurements, indicating for example whether a measured device is within specification.

The six-DOF triangulation scanner 2070 measures 3D coordinates of a workpiece using the principles of triangulation. There are several ways that the triangulation measurement may be implemented, depending on the pattern of light emitted by the scanner light source and the type of photosensitive array. For example, if the pattern of light emitted by the scanner light source is a line of light or a point of light scanned into the shape of a line and if the photosensitive array is a two dimensional array, then one dimension of the two dimensional array corresponds to a direction of a point on the surface of the workpiece. The other dimension of the two dimensional array corresponds to the distance of the point from the scanner light source. Hence the three dimensional coordinates of each point along the line of light emitted by scanner light source is known relative to the local frame of reference of the six-DOF scanner 2070.

For a six-DOF scanner 2070 held by hand, a line of laser light emitted by the scanner light source may be moved in such a way as to "paint" the surface of the workpiece, thereby obtaining the three dimensional coordinates for the entire surface. It is also possible to "paint" the surface of a workpiece using a scanner light source that emits a structured pattern of light over an area. In an embodiment, the structured light may be in the form of a coded pattern that may be evaluated to determine three-dimensional coordinates based on single image frames collected by the camera of the scanner 2080.

Figure 23A:
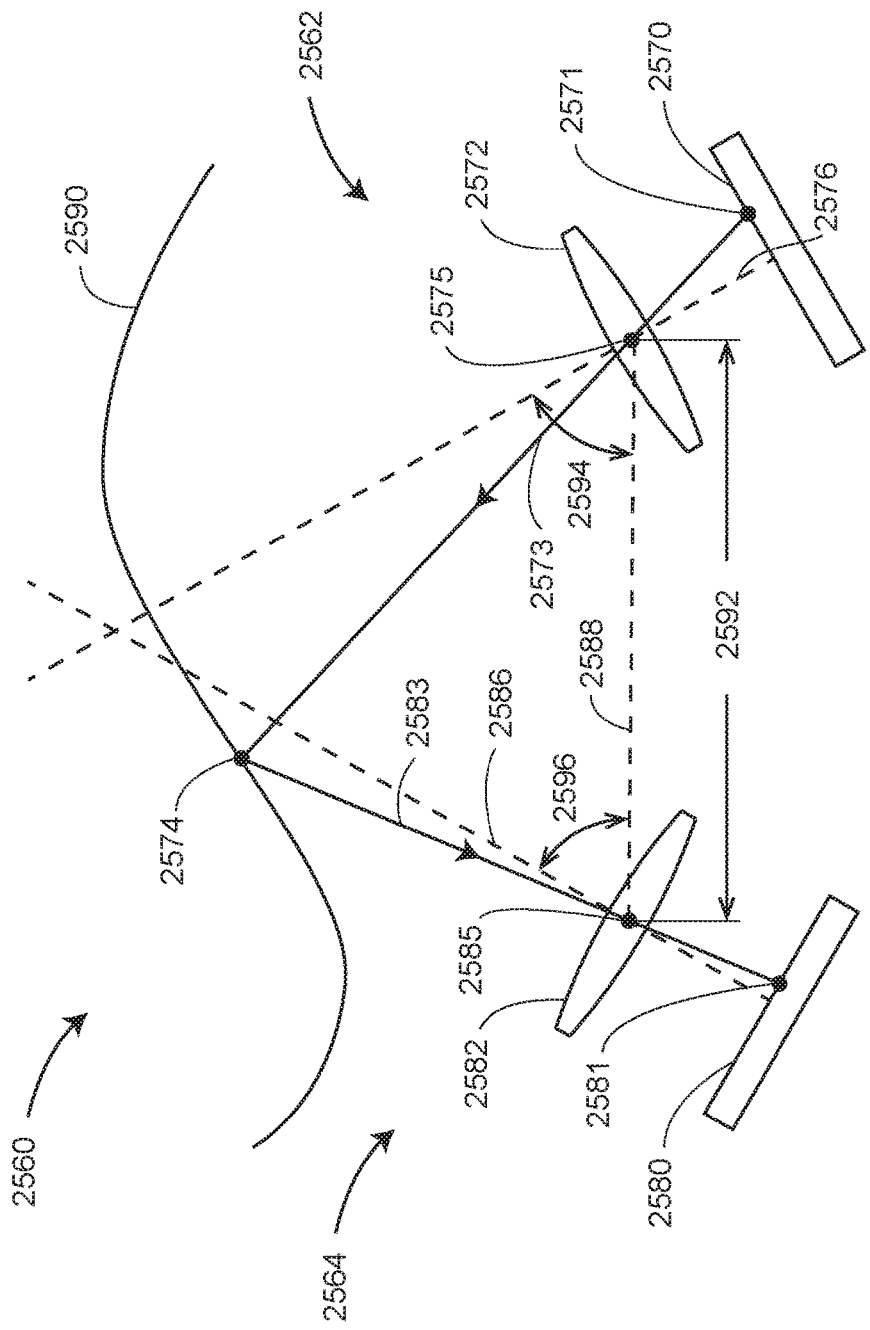
FIGS. 23A, 23B, and 23C are schematic representations illustrating the principles of operation of triangulation based scanning measurement systems.
Figure 23B:
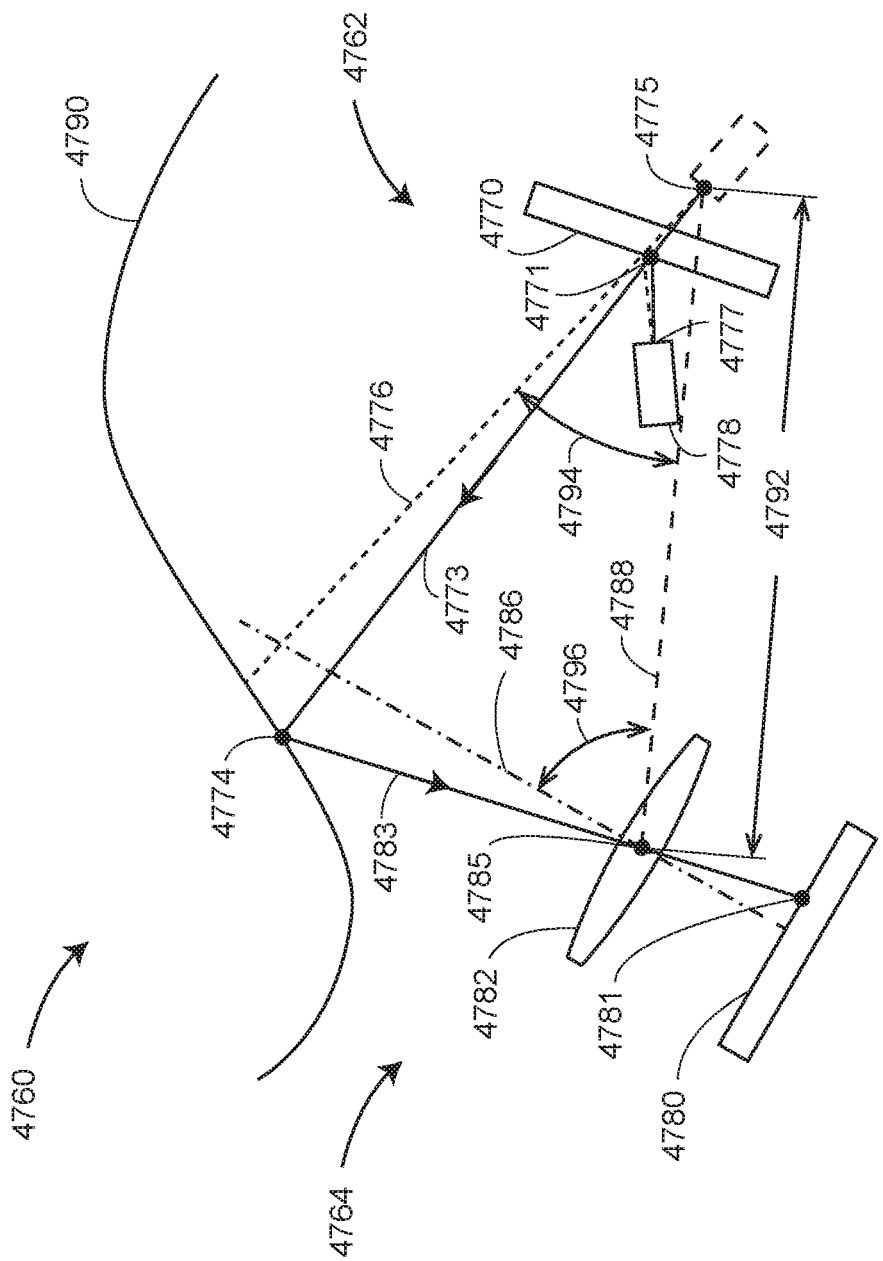

A more complete explanation of the principles of triangulation applicable to the six-DOF triangulation scanner 2070 are given with reference to the system 2560 of FIG. 23A and the system 4760 of FIG. 23B. Referring first to FIG. 23A, the system 2560 includes a projector 2562 and a camera 2564. The projector 2562 includes a source pattern of light 2570 lying on a source plane and a projector lens 2572. The projector lens may include several lens elements. The projector lens has a lens perspective center 2575 and a projector optical axis 2576. The ray of light 2573 travels from a point 2571 on the source pattern of light through the lens perspective center onto the object 2590, which it intercepts at a point 2574.

The camera 2564 includes a camera lens 2582 and a photosensitive array 2580. The camera lens 2582 has a lens perspective center 2585 and an optical axis 2586. A ray of light 2583 travels from the object point 2574 through the camera perspective center 2585 and intercepts the photosensitive array 2580 at point 2581.

The line segment that connects the perspective centers is the baseline 2588 in FIG. 23A and the baseline 4788 in FIG. 23B. The length of the baseline is called the baseline length (2592, 4792). The angle between the projector optical axis and the baseline is the baseline projector angle (2594, 4794). The angle between the camera optical axis (2583, 4786) and the baseline is the baseline camera angle (2596, 4796). If a point on the source pattern of light (2570, 4771) is known to correspond to a point on the photosensitive array (2581, 4781), then it is possible using the baseline length, baseline projector angle, and baseline camera angle to determine the sides of the triangle connecting the points 2585, 2574, and 2575, and hence determine the surface coordinates of points on the surface of object 2590 relative to the frame of reference of the measurement system 2560. To do this, the angles of the sides of the small triangle between the projector lens 2572 and the source pattern of light 2570 are found using the known distance between the lens 2572 and plane 2570 and the distance between the point 2571 and the intersection of the optical axis 2576 with the plane 2570. These small angles are added or subtracted from the larger angles 2596 and 2594 as appropriate to obtain the desired angles of the triangle. It will be clear to one of ordinary skill in the art that equivalent mathematical methods can be used to find the lengths of the sides of the triangle 2574-2585-2575 or that other related triangles may be used to obtain the desired coordinates of the surface of object 2590.

Referring first to FIG. 23B, the system 4760 is similar to the system 2560 of FIG. 23A except that the system 4760 does not include a lens. The system may include a projector 4762 and a camera 4764. In the embodiment illustrated in FIG. 23B, the projector includes a light source 4778 and a light modulator 4770. The light source 4778 may be a laser light source since such a light source may remain in focus for a long distance using the geometry of FIG. 23B. A ray of light 4773 from the light source 4778 strikes the optical modulator 4770 at a point 4771. Other rays of light from the light source 4778 strike the optical modulator at other positions on the modulator surface. In an embodiment, the optical modulator 4770 changes the power of the emitted light, in most cases by decreasing the optical power to a degree. In this way, the optical modulator imparts an optical pattern to the light, referred to here as the source pattern of light, which is at the surface of the optical modulator 4770. The optical modulator 4770 may be a DLP or LCOS device for example. In some embodiments, the modulator 4770 is transmissive rather than reflective. The light emerging from the optical modulator 4770 appears to emerge from a virtual light perspective center 4775. The ray of light appears to emerge from the virtual light perspective center 4775, pass through the point 4771, and travel to the point 4774 at the surface of object 4790.

The baseline is the line segment extending from the camera lens perspective center 4785 to the virtual light perspective center 4775. In general, the method of triangulation involves finding the lengths of the sides of a triangle, for example, the triangle having the vertex points 4774, 4785, and 4775. A way to do this is to find the length of the baseline, the angle between the baseline and the camera optical axis 4786, and the angle between the baseline and the projector reference axis 4776. To find the desired angle, additional smaller angles are found. For example, the small angle between the camera optical axis 4786 and the ray 4783 can be found by solving for the angle of the small triangle between the camera lens 4782 and the photosensitive array 4780 based on the distance from the lens to the photosensitive array and the distance of the pixel from the camera optical axis. The angle of the small triangle is then added to the angle between the baseline and the camera optical axis to find the desired angle. Similarly for the projector, the angle between the projector reference axis 4776 and the ray 4773 is found can be found by solving for the angle of the small triangle between these two lines based on the known distance of the light source 4777 and the surface of the optical modulation and the distance of the projector pixel at 4771 from the intersection of the reference axis 4776 with the surface of the optical modulator 4770. This angle is subtracted from the angle between the baseline and the projector reference axis to get the desired angle.

The camera 4764 includes a camera lens 4782 and a photosensitive array 4780. The camera lens 4782 has a camera lens perspective center 4785 and a camera optical axis 4786. The camera optical axis is an example of a camera reference axis. From a mathematical point of view, any axis that passes through the camera lens perspective center may equally easily be used in the triangulation calculations, but the camera optical axis, which is an axis of symmetry for the lens, is customarily selected. A ray of light 4783 travels from the object point 4774 through the camera perspective center 4785 and intercepts the photosensitive array 4780 at point 4781. Other equivalent mathematical methods may be used to solve for the lengths of the sides of a triangle 4774-4785-4775, as will be clear to one of ordinary skill in the art.

Although the triangulation method described here is well known, some additional technical information is given hereinbelow for completeness. Each lens system has an entrance pupil and an exit pupil. The entrance pupil is the point from which the light appears to emerge, when considered from the point of view of first-order optics. The exit pupil is the point from which light appears to emerge in traveling from the lens system to the photosensitive array. For a multi-element lens system, the entrance pupil and exit pupil do not necessarily coincide, and the angles of rays with respect to the entrance pupil and exit pupil are not necessarily the same. However, the model can be simplified by considering the perspective center to be the entrance pupil of the lens and then adjusting the distance from the lens to the source or image plane so that rays continue to travel along straight lines to intercept the source or image plane. In this way, the simple and widely used model shown in FIG. 23A is obtained. It should be understood that this description provides a good first order approximation of the behavior of the light but that additional fine corrections can be made to account for lens aberrations that can cause the rays to be slightly displaced relative to positions calculated using the model of FIG. 23A. Although the baseline length, the baseline projector angle, and the baseline camera angle are generally used, it should be understood that saying that these quantities are required does not exclude the possibility that other similar but slightly different formulations may be applied without loss of generality in the description given herein.

When using a six-DOF scanner, several types of scan patterns may be used, and it may be advantageous to combine different types to obtain the best performance in the least time. For example, in an embodiment, a fast measurement method uses a two-dimensional coded pattern in which three-dimensional coordinate data may be obtained in a single shot. In a method using coded patterns, different characters, different shapes, different thicknesses or sizes, or different colors, for example, may be used to provide distinctive elements, also known as coded elements or coded features. Such features may be used to enable the matching of the point 2571 to the point 2581. A coded feature on the source pattern of light 2570 may be identified on the photosensitive array 2580.

An advantage of using coded patterns is that three-dimensional coordinates for object surface points can be quickly obtained. However, in most cases, a sequential structured light approach, such as the sinusoidal phase-shift approach discussed above, will give more accurate results. Therefore, the user may advantageously choose to measure certain objects or certain object areas or features using different projection methods according to the accuracy desired. By using a programmable source pattern of light, such a selection may easily be made.

The triangulation scanning methods discussed herein above have mostly discussed the case in which the scanner includes one projector and one camera separated by a baseline. An alternative approach is place a projector and two cameras in a triangular arrangement. Epipolar relationships inherent in the triangulation geometry may then be used to eliminate ambiguities in the projected pattern of light. Using this approach, it is possible to determine a correspondence between projected and imaged spots for an unstructured pattern of light. For example, with this approach, it is possible to obtain a correspondence for points generated using a diffraction pattern but without requiring multiple sequential measurements.

As stated herein above, the projector 2520 may project a two dimensional pattern of light, which is sometimes called structured light. Such light emerges from the projector lens perspective center and travels in an expanding pattern outward until it intersects the object 2528. Examples of this type of pattern are the coded pattern and the periodic pattern, both discussed hereinabove. The projector 2520 may alternatively project a one-dimensional pattern of light. Such projectors are sometimes referred to as laser line probes or laser line scanners. Although the line projected with this type of scanner has width and a shape (for example, it may have a Gaussian beam profile in cross section), the information it contains for the purpose of determining the shape of an object is one dimensional. So a line emitted by a laser line scanner intersects an object in a linear projection. The illuminated shape traced on the object is two dimensional. In contrast, a projector that projects a two-dimensional pattern of light creates an illuminated shape on the object that is three dimensional. One way to make the distinction between the laser line scanner and the structured light scanner is to define the structured light scanner as a type of scanner that contains at least three non-collinear pattern elements. For the case of a two-dimensional pattern that projects a coded pattern of light, the three non-collinear pattern elements are recognizable because of their codes, and since they are projected in two dimensions, the at least three pattern elements must be non-collinear. For the case of the periodic pattern, such as the sinusoidally repeating pattern, each sinusoidal period represents a plurality of pattern elements. Since there is a multiplicity of periodic patterns in two dimensions, the pattern elements must be non-collinear. In contrast, for the case of the laser line scanner that emits a line of light, all of the pattern elements lie on a straight line. Although the line has width and the tail of the line cross section may have less optical power than the peak of the signal, these aspects of the line are not evaluated separately in finding surface coordinates of an object and therefore do not represent separate pattern elements. Although the line may contain multiple pattern elements, these pattern elements are collinear.

Figure 23C:
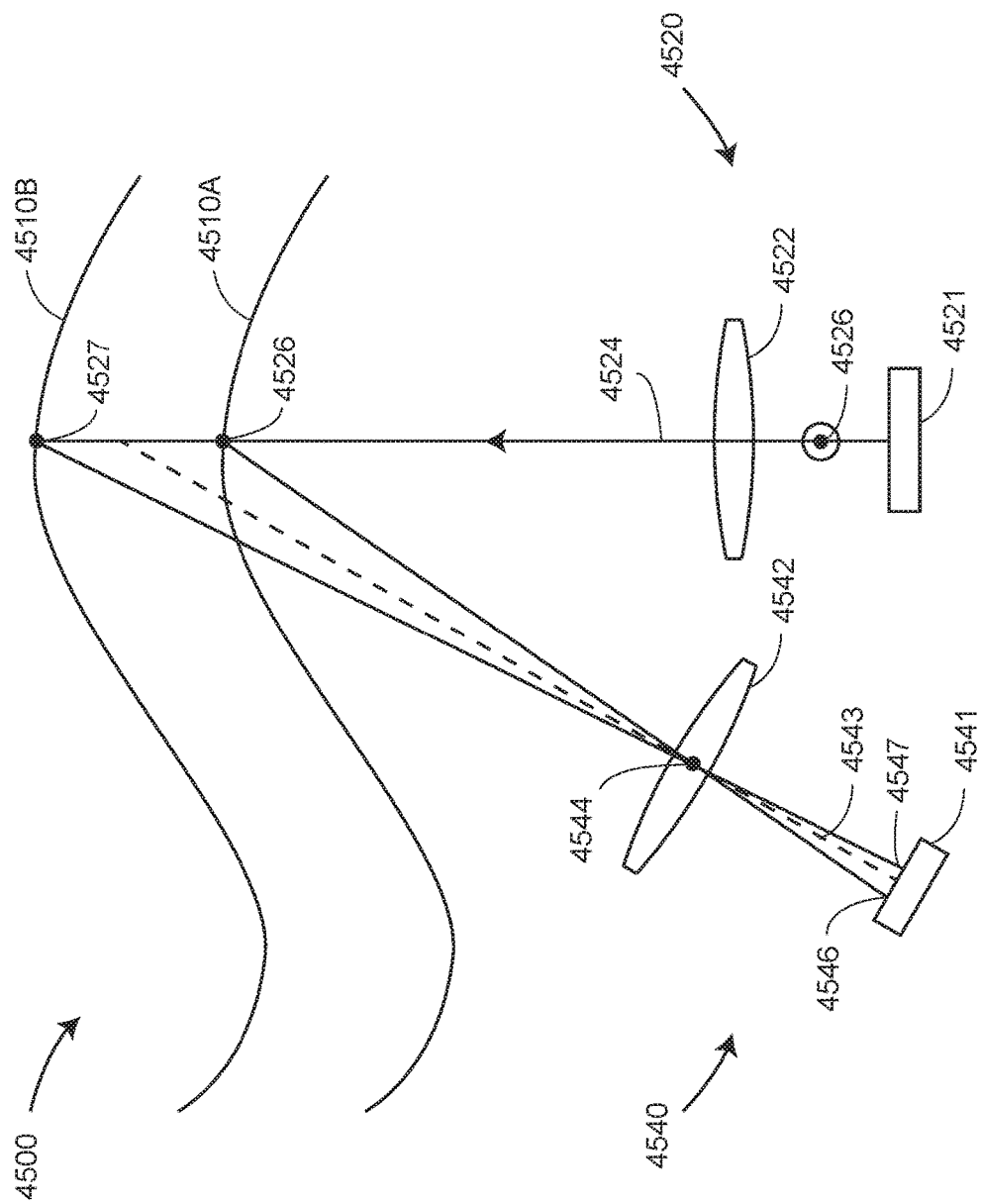

A method for calculating three dimensional coordinates of an object surface is now given with reference to FIG. 23C. The line scanner system 4500 includes a projector 4520 and a camera 4540. The projector 4520 includes a source pattern of light 4521 and a projector lens 4522. The source pattern of light includes an illuminated pattern in the form of a line. The projector lens includes a projector perspective center and a projector optical axis that passes through the projector perspective center. In the example of FIG. 23C, a central ray of the beam of light 4524 is aligned with the perspective optical axis. The camera 4540 includes a camera lens 4542 and a photosensitive array 4541. The lens has a camera optical axis 4543 that passes through a camera lens perspective center 4544. In the exemplary system 4500, the projector optical axis, which is aligned to the beam of light 4524, and the camera lens optical axis 4544, are perpendicular to the line of light 4526 projected by the source pattern of light 4521. In other words, the line 4526 is in the direction perpendicular to the paper in FIG. 23C. The line strikes an object surface, which at a first distance from the projector is object surface 4510A and at a second distance from the projector is object surface 4520A. It is understood that at different heights above or below the paper of FIG. 23C, the object surface may be at a different distance from the projector than the distance to either object surface 4520A or 4520B. For a point on the line of light 4526 that also lies in the paper of FIG. 23C, the line of light intersects surface 4520A in a point 4526 and it intersects the surface 4520B in a point 4527. For the case of the intersection point 4526, a ray of light travels from the point 4526 through the camera lens perspective center 4544 to intersect the photosensitive array 4541 in an image point 4546. For the case of the intersection point 4527, a ray of light travels from the point 4527 through the camera lens perspective center to intersect the photosensitive array 4541 in an image point 4547. By noting the position of the intersection point relative to the position of the camera lens optical axis 4544, the distance from the projector (and camera) to the object surface can be determined. The distance from the projector to other points on the line of light 4526, that is points on the line of light that do not lie in the plane of the paper of FIG. 23C, may similarly be found. In the usual case, the pattern on the photosensitive array will be a line of light (in general, not a straight line), where each point in the line corresponds to a different position perpendicular to the plane of the paper, and the position perpendicular to the plane of the paper contains the information about the distance from the projector to the camera. Therefore, by evaluating the pattern of the line in the image of the photosensitive array, the three-dimensional coordinates of the object surface along the projected line can be found. Note that the information contained in the image on the photosensitive array for the case of a line scanner is contained in a (not generally straight) line. In contrast, the information contained in the two-dimensional projection pattern of structured light contains information over both dimensions of the image in the photosensitive array.

It should be noted that although the descriptions given above distinguish between line scanners and area (structured light) scanners based on whether three or more pattern elements are collinear, it should be noted that the intent of this criterion is to distinguish patterns projected as areas and as lines. Consequently patterns projected in a linear fashion having information only along a single path are still line patterns even though the one-dimensional pattern may be curved.

Figure 24:
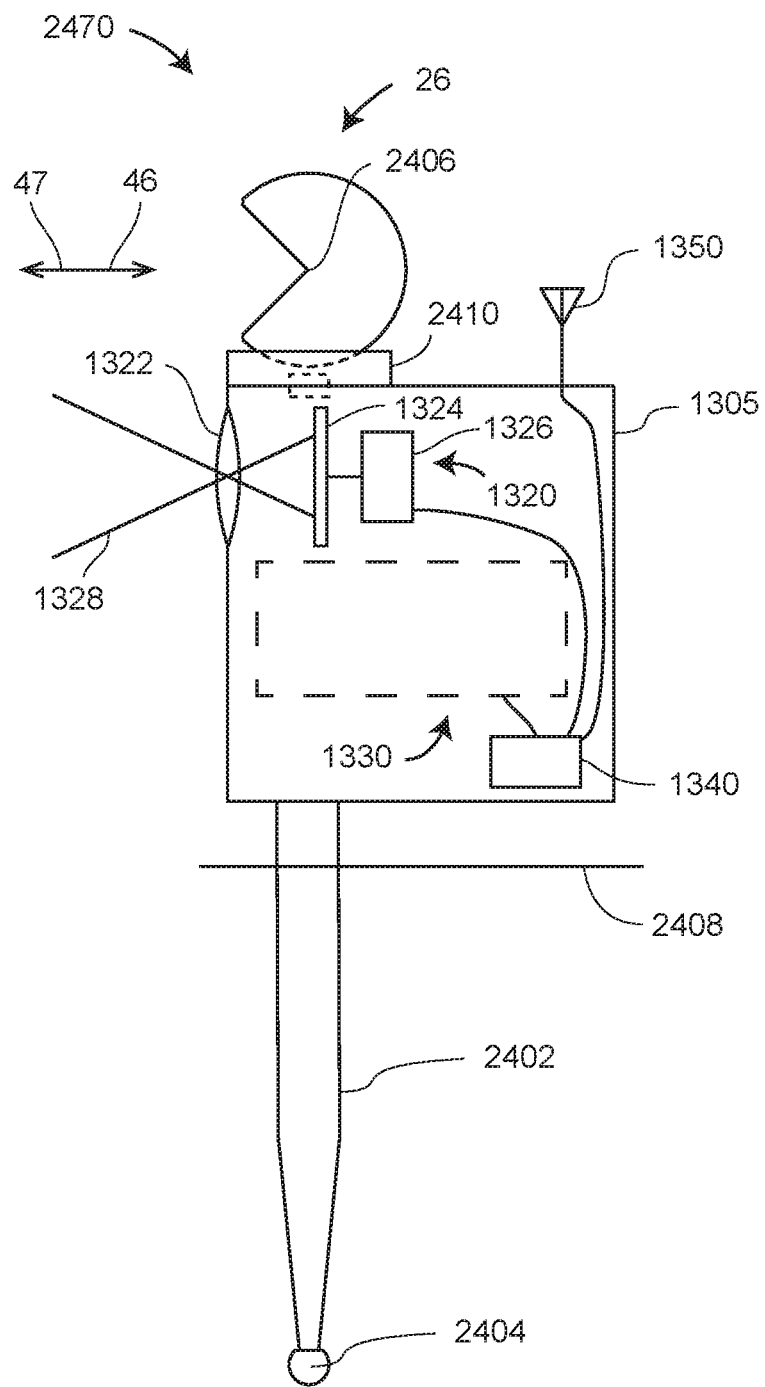
FIG. 24 is a schematic representation of an alternative probe that replaced a fixed retroreflector with a removable spherically mounted retroreflector according to an embodiment.

FIG. 24 is a schematic representation of a six-DOF tactile probe in which the built-in retroreflector, such as the retroreflector 1310 in FIG. 20, is replaced by a SMR 26 mounted on a magnetic nest 2410. In FIG. 24, the tactile probe is a simple type that is fixedly mounted to the body 1305.

Inclination and acceleration are often difficult to separate and in fact inclinometers and accelerometers are interchangeable. In many cases, six-DOF probes may be moved and so an important question to answer is how measurements can be made to ensure that inclination is being measured rather than acceleration. Several methods are possible and are now discussed with reference to six-DOF probe 2500 of FIG. 25. In a first method, inclination readings are observed over some time. In general, it is difficult to maintain a constant acceleration of a handheld probe for an extended time and so consistent readings indicates that inclination rather than acceleration is being observed.

In a second method, acceleration is directly observed using tracker 3D measurements of the vertex of the retroreflector 1310. In principle, this provides an independent method of determining acceleration, which can enable acceleration effects to be distinguished from those of inclination.

Figure 25:
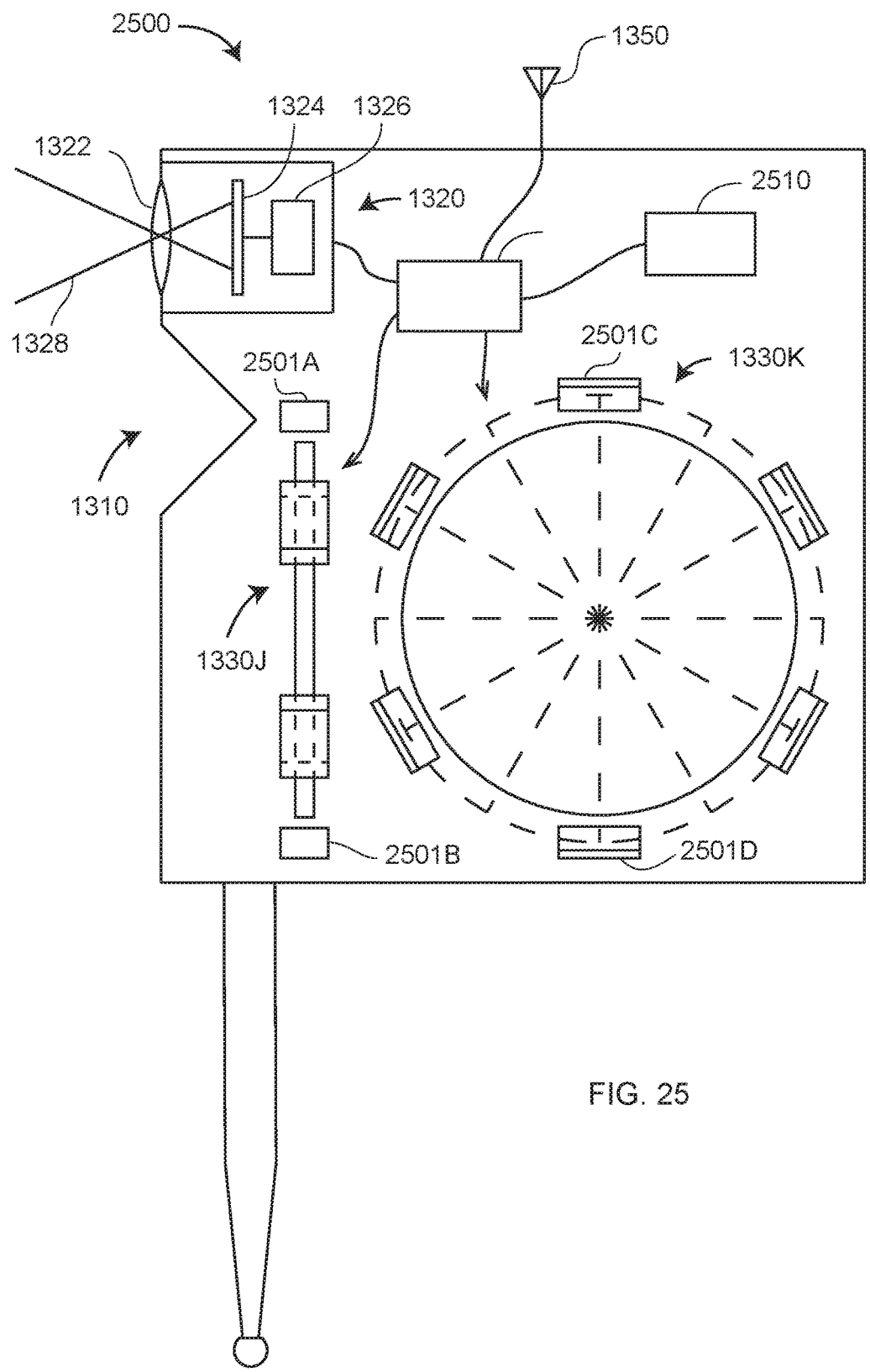
FIG. 25 is a schematic representation of a device that uses sensor information to distinguish between acceleration and inclination effects.

In a third method, an inertial sensor 2510 in FIG. 25 is used. The inertial sensor(s) may include a three-axis gyroscope and one or more acceleration sensors (which may include the inclination sensors 1300 of the present invention or additional inclination sensors, for example in a three-axis acceleration sensor). Such inertial sensors may be used to determine linear and angular velocity and linear and angular acceleration. The measured values may be fused using a Kalman filter to optimize estimates of kinematic parameters in the presence of measurement noise. The values may also be fused in the Kalman filter with the tracker 3D coordinate readings of the retroreflector 1310.

In a fourth method, multiple inclination sensors placed at different positions help to distinguish between linear acceleration and angular acceleration. For example, in FIG. 25, different readings by inclinometer sensors 2501C and 2501D may indicate the presence of angular acceleration about the pitch axis. Similarly, different readings by inclinometer sensors 2501A and 2501B may indicate the presence of angular acceleration about the roll axis.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A system comprising:
   a measurement device configured to send a first beam of light to a retroreflector target and to measure a distance, a first angle, and a second angle to the retroreflector target; and
   a probe assembly including the retroreflector target, an inclinometer sensor, and a camera, the inclinometer sensor configured to determine a two-dimensional inclination of the probe assembly relative to a gravity vector, the retroreflector configured to reflect the first beam of light as a first reflected light, the camera configured to capture an image of a second light, the system being configured to determine six degrees of freedom of the probe assembly based at least in part on the measured distance, the measured first angle, the measured second angle, the measured two-dimensional inclination, and the captured image of the camera,
   wherein the second light is either a light emission from a light source on the measurement device or a reflection of the first reflected light off an window of the measurement device.

2. The system of claim 1 wherein the retroreflector target is a cube-corner retroreflector.

3. The system of claim 1 wherein the measurement device is a laser tracker configured to emit the first beam of light at a first wavelength and to track movement of the retroreflector target.

4. The system of claim 1 wherein the inclinometer sensor includes a first one-axis inclinometer sensor and a second one-axis inclinometer sensor.

5. The system of claim 1 wherein the inclinometer sensor includes a first inclinometer assembly, the first inclinometer assembly having a first one-axis sensor, a second one-axis sensor, and a third one-axis sensor, the inclinometer assembly being configured to measure over 360 degrees of rotation about a first axis.

6. The system of claim 5 further wherein the inclinometer sensor further includes a second inclinometer assembly, the second inclinometer assembly having a fourth one-axis sensor, a fifth one-axis sensor, and a sixth one-axis sensor, the second inclinometer assembly being configured to cooperate with the first inclinometer assembly to measure over 360 degrees of rotation about each of the first axis and a second axis, the first axis and the second axis being mutually perpendicular.

7. The method of claim 4 wherein the first one-axis sensor and the second one-axis sensor are mounted on daughter boards configured to attach to connectors on a motherboard, each daughter board being perpendicular to the motherboard.

8. The system of claim 1 wherein the inclinometer sensor includes a first two-axis inclinometer sensor.

9. The system of claim 1 wherein the inclinometer sensor includes a first inclinometer assembly that measures inclination about a first axis of rotation, a second inclinometer assembly that measures inclination about a second axis of rotation, and a third inclinometer assembly that measures inclination about a third axis of rotation, wherein the first axis, the second axis and the third axis are mutually perpendicular.

10. The system of claim 9 wherein the first inclinometer assembly, the second inclinometer assembly, and the third inclinometer assembly each measure over an angle of 360 degrees.

11. The system of claim 1 wherein the inclinometer sensor includes a two-axis pendulum having two angular encoders, the two angular encoders together configured to measure a pitch angle and a roll angle of the inclinometer sensor.

12. The system of claim 3 wherein the camera is configured to image first reflected light reflected or scattered off a tracker window through which light from the retroreflector target is returned into the tracker, the first reflected light being at the first wavelength.

13. The system of claim 3 wherein the camera includes a lens coated to selectively pass light at the first wavelength.

14. The system of claim 1 wherein the light emitted from or reflected by the measurement device is a light emitted by a light source affixed to the measurement device.

15. The system of claim 2 wherein the cube-corner retroreflector is a glass prism.

16. The system of claim 1 wherein the retroreflector target is one of a plurality of retroreflector targets, each retroreflector target of the plurality of retroreflector targets located on different face of the probe assembly.

17. The system of claim 16 wherein the probe assembly includes a plurality of cameras, each camera located on a different face of the probe assembly.

18. The system of claim 1 wherein the probe assembly is attached to a tactile probe.

19. The system of claim 18 wherein the tactile probe is configured to rotate about a first axis relative to the probe assembly, the system further including a first angular encoder configured to measure a first angle of rotation about the first axis.

20. The system of claim 19 wherein the tactile probe is further configured to rotate about a second axis relative to the probe assembly, the second axis perpendicular to the first axis, the system further including a second angular encoder configured to measure a second angle of rotation about the second axis.

21. The system of claim 1 wherein the probe assembly is attached to a six-DOF triangulation scanner having a projector configured to project a pattern of light and the camera is configured to image the pattern projected onto an object, the projector and the camera separated by a baseline distance.

22. The system of claim 21 wherein the triangulation scanner is a structured light scanner configured to project a pattern of light over an area.

23. The system of claim 21 wherein the triangulation scanner is a line scanner configured to project a line of light.

24. The system of claim 21 wherein the triangulation scanner is configured to rotate about a first axis relative to the probe assembly, the system further including a first angular encoder configured to measure a first angle of rotation about the first axis.

25. The system of claim 24 wherein the triangulation scanner is further configured to rotate about a second axis relative to the probe assembly, the system further including a second angular encoder configured to measure a second angle of rotation about the second axis.

26. The system of claim 1 wherein the probe assembly is attached to a six-DOF projector configured to project a pattern of light onto an object.

27. The system of claim 1 wherein the probe assembly further includes an inertial measurement unit configured to be used in combination with a Kalman filter to account, at least in part, for the effect of probe velocity and acceleration.

28. The system of claim 27 wherein the inertial measurement unit includes a three-axis gyroscope.

29. The system of claim 28 wherein the inertial measurement unit further includes a three-axis accelerometer.

30. The system of claim 1 wherein the system further includes one or more processors configured to determine position and orientation of the probe assembly.

31. The system of claim 30 wherein the one or more processors are included in one or more of the probe assembly, the measurement device, and an external computing device.

32. The system of claim 31 wherein the measurement device and the probe assembly transfer information through wireless communication.

33. The system of claim 31 wherein the measurement device and the probe assembly transfer information through wired communication.

* * * * *